US008850168B2

(12) United States Patent  
Yamamoto et al.

(10) Patent No.: US 8,850,168 B2
(45) Date of Patent: Sep. 30, 2014

(54) PROCESSOR APPARATUS AND MULTITHREAD PROCESSOR APPARATUS

(75) Inventors: Takao Yamamoto, Osaka (JP); Shinji Ozaki, Osaka (JP); Masahide Kakeda, Ibaraki (JP); Masaitsu Nakajima, Osaka (JP)

(73) Assignee: Panasonic Corporation, Osaka (JP)

( * ) Notice: Subject to any disclaimer, the term of this patent is extended or adjusted under 35 U.S.C. 154(b) by 601 days.

(21) Appl. No.: 13/215,623

(22) Filed: Aug. 23, 2011

(65) Prior Publication Data

US 2012/0023311 A1 Jan. 26, 2012

Related U.S. Application Data

(63) Continuation of application No. PCT/JP2009/003857, filed on Aug. 11, 2009.

(30) Foreign Application Priority Data

Feb. 24, 2009  (JP) ................................. 2009-041568

(51) Int. Cl.
   *G06F 9/38*  (2006.01)
   *G06F 9/46*  (2006.01)
   *G06F 9/30*  (2006.01)

(52) U.S. Cl.
   CPC ............ *G06F 9/462* (2013.01); *G06F 9/30123* (2013.01); *G06F 9/30101* (2013.01); *G06F 9/3885* (2013.01); *G06F 9/3851* (2013.01)
   USPC ........................................................ 712/228

(58) Field of Classification Search
   CPC combination set(s) only.
   See application file for complete search history.

(56) References Cited

U.S. PATENT DOCUMENTS

| 5,481,719 | A | 1/1996 | Ackerman et al. |
| 5,606,696 | A | 2/1997 | Ackerman et al. |
| 6,061,711 | A * | 5/2000 | Song et al. .................... 718/108 |
| 7,032,046 | B2 | 4/2006 | Horii et al. |
| 7,386,707 | B2 | 6/2008 | Kurata et al. |
| 7,536,517 | B2 * | 5/2009 | Harris ........................... 711/150 |
| 7,921,281 | B2 | 4/2011 | Kurata et al. |

(Continued)

FOREIGN PATENT DOCUMENTS

| JP | 01-217635 | 8/1989 |
| JP | 4-084335 | 3/1992 |

(Continued)

OTHER PUBLICATIONS

Japanese Office Action dated May 21, 2013, issued in corresponding Japanese Application No. 2011-501354.

(Continued)

*Primary Examiner* — Eric Coleman
(74) *Attorney, Agent, or Firm* — McDermott Will & Emery LLP

(57) ABSTRACT

A processor apparatus according to the present invention is a processor apparatus which shares hardware resources between a plurality of processors, and includes: a first determination unit which determines whether or not a register in each of the hardware resources holds extension context data of a program that is currently executed; a second determination unit which determines to which processor the extension context data in the hardware resource corresponds; a first transfer unit which saves and restores the extension context data between programs in the processor; and a second transfer unit which saves and restores the extension context data between programs between different processors.

11 Claims, 28 Drawing Sheets

(56) References Cited

U.S. PATENT DOCUMENTS

| | | |
|---|---|---|
| 7,930,520 B2 | 4/2011 | Kurata et al. |
| 2003/0149864 A1 | 8/2003 | Furukawa et al. |
| 2004/0073730 A1 | 4/2004 | Horii et al. |
| 2006/0212687 A1 | 9/2006 | Chen et al. |
| 2006/0212853 A1 | 9/2006 | Sutardja |
| 2007/0143582 A1 | 6/2007 | Coon et al. |
| 2007/0286275 A1 | 12/2007 | Kimura et al. |
| 2008/0109809 A1 | 5/2008 | Morishita et al. |
| 2008/0209162 A1 | 8/2008 | Furukawa et al. |
| 2008/0209192 A1 | 8/2008 | Furukawa et al. |
| 2008/0215858 A1 | 9/2008 | Furukawa et al. |
| 2008/0270772 A1* | 10/2008 | Inoue et al. ............... 712/228 |

FOREIGN PATENT DOCUMENTS

| | | |
|---|---|---|
| JP | 4-84335 | 3/1992 |
| JP | 5-127926 | 5/1993 |
| JP | 5-165652 | 7/1993 |
| JP | 8-087420 | 4/1996 |
| JP | 2003-271399 | 9/2003 |
| JP | 2004-246862 | 9/2004 |
| JP | 2006-24180 | 1/2006 |
| JP | 2006-302261 | 11/2006 |
| JP | 2007-200288 | 8/2007 |
| JP | 2008-123045 | 5/2008 |
| WO | 2005/096168 | 10/2005 |

OTHER PUBLICATIONS

Japanese Office Action issued in Japanese Patent Application No. 2011-501354 mailed Aug. 27, 2013.

International Search Report and Written Opinion for PCT/JP2009/003857. dated Oct. 20, 2009 along with an english translation of ISR.

* cited by examiner

FIG. 5

| Virtual processor(LPID) | FPU No. to be used |
|---|---|
| LP0 | FPU0 |
| LP1 | FPU0, FPU1 |
| LP2 | FPU1 |

T1

| FPU No. | Virtual processor currently used (LPID) | Lock attribute |
|---|---|---|
| LP0 | LP2 | FL = 0 |
| LP1 | LP0 | FL = 1 |

| Bit | 31 | 30 | 29 | 28 | 27 | 26 | 25 | 24 |
|---|---|---|---|---|---|---|---|---|
| Bit name | BASEADDR[31:24] | | | | | | | |
| Initial value | 0 | | | | | | | |
| R/W | R/W | | | | | | | |
| Bit | 23 | 22 | 21 | 20 | 19 | 18 | 17 | 16 |
| Bit name | BASEADDR[23:16] | | | | | | | |
| Initial value | 0 | | | | | | | |
| R/W | R/W | | | | | | | |
| Bit | 15 | 14 | 13 | 12 | 11 | 10 | 9 | 8 |
| Bit name | PS | | PN | | | | | |
| Initial value | 11 | | 111111 | | | | | |
| R/W | R/W | | R/W | | | | | |
| Bit | 7 | 6 | 5 | 4 | 3 | 2 | 1 | 0 |
| Bit name | PVID3W | PVID2W | PVID1W | PVID0W | PVID3R | PVID2R | PVID1R | PVID0R |
| Initial value | 1 | 1 | 1 | 1 | 1 | 1 | 1 | 1 |
| R/W | R/W | R/W | R/W | R/W | R/W | R/W | R/W | R/W |

FIG. 18

| Bit | 31 | 30 | 29 | 28 | 27 | 26 | 25 | 24 |
|---|---|---|---|---|---|---|---|---|
| Bit name | PVERR | reserved | | | | PVID | | |
| Initial value | 0 | 0 | | | | 0 | | |
| R/W | R | R | | | | R | | |
| Bit | 23 | 22 | 21 | 20 | 19 | 18 | 17 | 16 |
| Bit name | reserved | | | | | BECID | | |
| Initial value | | | | | | 0 | | |
| R/W | | | | | | R | | |
| Bit | 15 | 14 | 13 | 12 | 11 | 10 | 9 | 8 |
| Bit name | reserved | BEMR[2:0] | | | BEME | reserved | | BERW |
| Initial value | 0 | 0 | | | 0 | 0 | | 0 |
| R/W | R | R | | | R | R | | R |
| Bit | 7 | 6 | 5 | 4 | 3 | 2 | 1 | 0 |
| Bit name | reserved | | | | | | | |
| Initial value | 0 | | | | | | | |
| R/W | R | | | | | | | |

| Bit | 31 | 30 | 29 | 28 | 27 | 26 | 25 | 24 |
|---|---|---|---|---|---|---|---|---|
| Bit name | | | | BEA[31:24] | | | | |
| Initial value | | | | unknown | | | | |
| R/W | | | | R | | | | |
| Bit | 23 | 22 | 21 | 20 | 19 | 18 | 17 | 16 |
| Bit name | | | | BEA[23:16] | | | | |
| Initial value | | | | unknown | | | | |
| R/W | | | | R | | | | |
| Bit | 15 | 14 | 13 | 12 | 11 | 10 | 9 | 8 |
| Bit name | | | | BEA[15:8] | | | | |
| Initial value | | | | unknown | | | | |
| R/W | | | | R | | | | |
| Bit | 7 | 6 | 5 | 4 | 3 | 2 | 1 | 0 |
| Bit name | | | | BEA[8:0] | | | | |
| Initial value | | | | unknown | | | | |
| R/W | | | | R | | | | |

FIG. 22A

| TVID | Way |
|---|---|
| TVID0 | Way 0-1 |
| TVID1 | Way 2-7 |

FIG. 22B

| LP | Way |
|---|---|
| LP0 | Way 0-1 |
| LP1 | Way 2-5 |
| LP2 | Way 5-7 |

FIG. 25

| Bit | 31 | 30 | 29 | 28 | 27 | 26 | 25 | 24 |
|---|---|---|---|---|---|---|---|---|
| Bit name | SYSINT | reserved | | LPID[4:0] | | | | |
| Initial value | 0 | 0 | | 0 | | | | |
| R/W | R/W | R | | R/W | | | | |
| Bit | 23 | 22 | 21 | 20 | 19 | 18 | 17 | 16 |
| Bit name | reserved | | | | | | LPINT | HWEVT |
| Initial value | 0 | | | | | | 0 | 0 |
| R/W | R | | | | | | R/W | R/W |
| Bit | 15 | 14 | 13 | 12 | 11 | 10 | 9 | 8 |
| Bit name | LV[3:0] | | | | reserved | | | IE |
| Initial value | 0 | | | | 0 | | | 0 |
| R/W | R/W | | | | R | | | R/W |
| Bit | 7 | 6 | 5 | 4 | 3 | 2 | 1 | 0 |
| Bit name | reserved | | | IR | reserved | | | ID |
| Initial value | 0 | | | 0 | 0 | | | 0 |
| R/W | R | | | R/W | R | | | R/W |

134  
171 → SYSINT  
172 → LPID[4:0]  
173 → LPINT  
174 → HWEVT

PROCESSOR APPARATUS AND MULTITHREAD PROCESSOR APPARATUS

CROSS REFERENCE TO RELATED APPLICATION

This is a continuation application of PCT application No. PCT/JP2009/003857 filed on Aug. 11, 2009, designating the United States of America.

BACKGROUND OF THE INVENTION (1) Field of the Invention

The present invention relates to a processor apparatus and a multithread processor apparatus which include a plurality of processors which execute programs for the processor apparatus by switching the programs, and relates particularly to a processor apparatus and a multithread processor which share a hardware resource between a plurality of processors.

(2) Description of the Related Art

Along with rapid development of digital technology and audio-visual compression and decompression techniques in recent years, higher performance is expected of a processor incorporated in a digital television, a digital video recorder (DVD recorder and so on), a cellular phone, and a video sound device (camcoder and so on).

For example, a multithread processor is known as a processor which realizes high performance (for example, see Patent Reference 1: Japanese Unexamined Patent Application Publication 2006-302261). This multithread processor can improve processing efficiency by simultaneously executing a plurality of threads. In addition, the multithread processor can improve, in executing the threads, area efficiency of the processor as compared to the case of providing a plurality of processors independently.

On the other hand, such a processor performs: control-related host processing which does not require real-timeness; and media processing such as compression and decompression which require real-timeness.

For example, an audio-visual processing integrated circuit described in Patent Reference 2 (International Publication 2005/096168) includes: a microcontroller block for performing host processing and a media processing block for performing media processing.

In addition, there is a technique called lazy context switch as a technique of minimizing context switching of a floating point number processing unit (FPU). According to the technique, in execution context, save and restore of FPU context is delayed until execution of an FPU instruction is required. In other words, asynchronously with save and restore of context of an ordinary processor, context switching of the FPU is executed, so as to suppress the frequency to a minimum.

Since the FPU includes a number of registers, and since some programs on which time-division multiplexing is performed do not use the FPU, the above method is intended to reduce overhead for save and restore of the FPU context.

SUMMARY OF THE INVENTION

However, the multiprocessor has the following problem in using a hardware resource such as the FPU.

When each processor includes an FPU and applies the lazy context switch for each processor, circuit size increases. Furthermore, this causes variation in operating rate of the FPU between processors, thus not allowing increase in use efficiency.

An object of the present invention is to provide a processor apparatus and a multithread processor apparatus which allow sharing a hardware resource such as the FPU between a plurality of processors, to thereby increase use efficiency.

To solve the problem described above, a processor apparatus according to an aspect of the present invention includes: a plurality of processors which execute a plurality of programs, switching the programs; at least one hardware resource which includes a register for holding register data and complements execution of an instruction to be executed by each of the processors; a memory for storing extension context data for each program among the programs that includes a predetermined instruction for using the at least one hardware resource, the extension context data being a copy of the register data in the at least one hardware resource; a control unit which controls save and restore of the extension context data between the at least one hardware resource and the memory; a first determination unit which determines whether or not there is a possibility that the extension context data of one of the programs that is currently executed is held in the at least one hardware resource; and a second determination unit which determines whether or not the extension context data in the at least one hardware resource belongs to one of the processors that has attempted to execute the predetermined instruction, and in the processor apparatus, the at least one hardware resource executes the predetermined instruction, without the control unit performing the save and restore of the extension context data, when the execution of the predetermined instruction is attempted, and when the first determination unit determines that there is the possibility and the second determination unit determines that the extension context data in the at least one hardware resource belongs to the one of the processors that has attempted to execute the predetermined instruction.

With this configuration, it is possible to share each hardware resource between the processors. In other words, any processor can use each hardware resource. This accordingly increases use efficiency of the hardware resource. Since this does not require providing a hardware resource for each processor, it is only necessary to provide a minimum number of hardware resources corresponding to required processing performance, thus reducing or optimizing circuit size.

Here, the control unit may include: a first transfer unit which saves the extension context data from the at least one hardware resource to the memory and restore extension context data belonging to a same one of the processors that the saved extension context data belongs to, the save and restore being performed according to results of the determination by the first and the second determination units; and a second transfer unit which saves the extension context data from the at least one hardware resource to the memory and restore extension context data belonging to an other of the processors that is different from the one of the processors that the saved extension context data belongs to, the save and restore being performed according to the results of the determination by the first and the second determination units.

Here, the at least one hardware resource may be an extended calculation unit which executes an extended instruction that is not executable by the processors, and the predetermined instruction may be the extended instruction.

With this configuration, it is possible to efficiently share, between the processors, the extended calculation unit such as an FPU or hardware accelerator, thus minimizing save and restore of the extension context data.

Here, the first determination unit may include a data determination unit provided for each of the processors, and the determination unit may determine, when one of the processors that corresponds to the data determination unit attempts to execute the predetermined instruction in the one of the programs, whether or not there is a possibility that the extension context data of the one of the programs that is currently executed by the one of the processors that corresponds to the data determination unit is held in the at least one hardware resource, the second determination unit may include a processor determination unit provided for each of the processors, and the processor determination unit may determine whether or not the extension context data in the at least one hardware resource belongs to the one of the processors that has attempted to execute the predetermined instruction.

With this configuration, the data determination unit and the processor determination unit are provided for each of the processors, thus allowing use of the hardware resource without any influence on the other processors at all, when the hardware resource holds the extension context data of the program that is currently executed (that is, the program that has issued the predetermined instruction).

Here, each of the processors may include a state register, a copy of data in the state register may be included in context data of each of the programs, the state register may hold first state information and second state information, the first state information indicating, for each of the at least one hardware resource, whether or not there is the possibility that the extension context data of the one of the programs that is currently executed is held in the at least one hardware resource, and the second state information indicating, for each of the at least one hardware resource, one of the processors that corresponds to the extension context data held in the at least one hardware resource, the data determination unit may include a first determination circuit which determines whether the first state information is true or false when one of the processors that corresponds to the data determination unit attempts to execute the predetermined instruction in the one of the programs that is currently executed, and which generates a first exceptional interrupt signal when the first state information is determined to be false, the processor determination unit may include a second determination circuit which determines whether or not the one of the processors that corresponds to the data determination unit matches the one of the processors that is indicated by the second state information when the first determination unit corresponding to the processor determination unit determines that the first state information is true, and which generates a second exceptional interrupt signal when the one of the processors that corresponds to the data determination unit does not match the one of the processors that is indicated, and the at least one hardware resource may promptly operate according to the predetermined instruction without waiting for the save and restore of the extension context data, when the second determination circuit determines that the corresponding one of the processors matches the one of the processors.

With this configuration, the data determination unit and the processor determination unit are configured with hardware (the first determination circuit and the second determination circuit), thus allowing using the hardware resource at high speed without any influence on the other processors at all, when the hardware resource holds the extension context data of the program that is currently executed (that is, the program that has issued the predetermined instruction).

Here, the first transfer unit may include a save and restore unit provided for each of the processors, the save and restore unit may save the extension context data from the at least one hardware resource to the memory and restore, from the memory to the at least one hardware resource, the extension context data of the one of the processors that has attempted to execute the predetermined instruction, when the first exceptional interrupt signal is generated, the processors may include a first processor and a second processor, the first processor may execute a plurality of programs by time division multiplexing, by executing a first operating system, the second processor may execute a plurality of programs by time division multiplexing, by executing a second operating system that is different from the first operating system, the save and restore unit in the first processor may be activated by the first operating system when the first determination circuit in the first processor generates the first exceptional interrupt signal, and the save and restore unit in the second processor may be activated by the second operating system when the first determination circuit in the second processor generates the first exceptional interrupt signal.

With this configuration, it is possible to share the hardware resource between processors which execute different operating systems (hereinafter, abbreviated as OS). When it is necessary to switch the extension context data of the hardware resource between programs in the processor, it is possible to efficiently switch the extension context data within the OS without any influence on the other OS.

Here, at least one of the processors may execute a third operating system which manages the first operating system and the second operating system, and the second transfer unit may be activated by the third operating system when the second determination circuit in any one of the processors generates the second exceptional interrupt signal.

With this configuration, it is possible to share the hardware resource between processors which execute different operating systems (hereinafter, abbreviated as OS). When it is necessary to switch the extension context data of the hardware resource between processors each executing a different OS, the extension context data is switched under control of the third OS. This hides the switching of the extension context data from the program on any processor, thus allowing easily diverting a conventional program.

Here, the third operating system may wait for the one of the at least one hardware resource to be released and subsequently activate the second transfer unit, when the second determination circuit in the any one of the processors generates the second exceptional interrupt signal, and when one of the at least one hardware resource is currently executing a predetermined instruction of an other of the at least one of the processors.

With this configuration, when the processors executing different OS compete for the predetermined instruction (in the case of competition for use of the hardware resource), it is possible to easily mediate the competition under the control of the third OS.

Here, the second transfer unit may atomically perform operation, from start of an operation of saving, from the at least one hardware resource to the memory, the extension context data corresponding to the other of the processors, to completion of an operation of restoring, from the memory to the at least one hardware resource, the extension context data of the one of the processors that has attempted to execute the predetermined instruction.

With this configuration, since the second transfer unit atomically performs operation, from start of the save to completion of the restore, it is possible to share the hardware resource between different processors without causing contradiction in the context data of each program (particularly first state information and second state information) and without interference from another processor.

Here, each of the processors may include a clear circuit which clears the second state information corresponding to each of the processors when each of the processors moves into one of a stop state, a wait state, and a sleep state.

With this configuration, when one processor moves into one of the stop, wait, and sleep states, the clear circuit releases the hardware resource currently used by the processor, thus allowing increase in use efficiency of the hardware resource shared between a plurality of processors.

Here, the state register may hold third state information indicating whether or not the second state information is to be locked, and the third operating system may inhibit the second state information from being cleared by the clear circuit when the third state information indicates that the second state information is to be locked.

With this configuration, when the processor using the hardware resource is fixed or when a certain processor uses the hardware resource with priority, it is possible to let the processor continue occupying the hardware resource by a programmer setting the third state information to "Lock", thus reducing redundant save and restore of the extension context data.

In addition, a multithread processor apparatus according to an aspect of the present invention may include: a multithread processor including a plurality of virtual processors each of which switches between a plurality of programs by simultaneously executing a plurality of threads; at least one hardware resource which includes a register for holding register data and complements execution of an instruction to be executed by each of the virtual processors; a memory for storing extension context data for each program among the programs that includes a predetermined instruction for using the at least one hardware resource, the extension context data being a copy of the register data in the at least one hardware resource; a control unit which controls save and restore of the extension context data between the at least one hardware resource and the memory; a first determination unit which determines whether or not there is a possibility that the extension context data of the one of the programs that is currently executed is held in the at least one hardware resource; and a second determination unit which determines whether or not the extension context data in the at least one hardware resource belongs to one of the virtual processors that has attempted to execute the predetermined instruction, and in the multithread processor apparatus, the at least one hardware resource may execute the predetermined instruction, without the control unit performing the save and restore of the extension context data, when the first determination unit determines that there is the possibility and the second determination unit determines that the extension context data in the at least one hardware resource belongs to the one of the virtual processors that has attempted to execute the predetermined instruction.

This configuration produces the same advantageous effect as above.

Here, the control unit may include: a first transfer unit which saves the extension context data from the at least one hardware resource to the memory and restore extension context data belonging to a same one of the virtual processors that the saved extension context data belongs to, the save and restore being performed according to results of the determination by the first and the second determination units; and a second transfer unit which saves the extension context data from the at least one hardware resource to the memory and restore extension context data belonging to an other of the virtual processors that is different from the one of the processors that the saved extension context data belongs to, the save and restore being performed according to the results of the determination by the first and the second determination unit.

Here, each of the virtual processors may correspond to at least one thread, the multithread processor may include: a plurality of instruction preparation units each of which fetches and decodes an instruction of the at least one thread; an execution unit which simultaneously executes the instruction that is decoded by each of the instruction preparation units and is at least one instruction corresponding to the at least one thread; and a state register provided for each of the instruction preparation units, the control unit may exchange, for each of the instruction preparation units, a currently-executing virtual processor and a not currently-executing virtual processor among the virtual processors, by exchanging a current thread with another thread, the copy of the register data in the state register of each of the instruction control units may be included in the context data for each of the virtual processors, the state register may hold: first state information indicating, for each of the at least one hardware resource, whether or not there is a possibility that the extension context data of the currently-executing virtual processor is held in the at least one hardware resource; and second state information indicating, for each of the at least one hardware resource, one of virtual processors that corresponds to the extension context data held in the at least one hardware resource, and the multithread processor may further include a clear circuit which clears the second state information in the state register in the instruction preparation unit when the currently-executing virtual processor is no longer executing as a result of exchanging the threads.

Here, the first determination unit may include a data determination unit provided for each of the instruction preparation units, the data determination unit may determine whether or not there is the possibility that the extension context data of the one of the programs that is currently executed is held in the at least one hardware resource by determining whether the first state information is true or false, when one of the at least one thread related to one of the instruction preparation units that corresponds to the data determination unit attempts to execute the predetermined instruction, the second determination unit may include a processor determination unit provided for each of the instruction preparation units, the processor determination unit may determine whether or not one of the virtual processors that is related to the one of the instruction preparation units that corresponds to the processor determination unit matches the one of the virtual processors that is indicated by the second state information, when the data determination unit in the one of the instruction preparation units that corresponds to the processor determination unit determines that the first state information is false, and may generate a second exceptional interrupt signal when the one of the virtual processors related to the one of the instruction preparation units that corresponds to the processor determination unit does not match the one of the virtual processors that is indicated, the multithread processor may further execute, as part of a function of an operating system, second exceptional interrupt processing that is activated by the second exceptional interrupt signal from the processor determination unit, the operating system may include obtainment processing for obtaining the at least one hardware resource and waiting processing for waiting for the at least one hardware resource to be released, the operating system may set the first information and the second information as the obtainment processing in the state register in the one of the instruction preparation units that has generated the second exceptional interrupt signal, when one of the at least one hardware resource is not currently used in one of the virtual processors belonging to an other of the instruction preparation units that is other than one of the instruction preparation units that includes the one of the virtual processors that has generated the second exceptional interrupt signal, the first state information indicating true and the second state information indicating the one of the virtual processors that has generated the second exceptional interrupt signal, and the operating system may perform the waiting processing when the one of the at least one hardware resource is currently used in the one of the virtual processors belonging to the other of the instruction preparation units that is other than the one of the instruction preparation units that includes the one of the virtual processors that has generated the second exceptional interrupt signal.

With this configuration, it is possible to efficiently share the hardware resource (for example, an extended calculation unit such as the FPU or hardware accelerator) between a plurality of processors. In other words, any processor is able to use each hardware resource. This accordingly increases use efficiency of the hardware resource. Since this does not require providing a hardware resource for each processor, it is only necessary to include a minimum number of hardware resources corresponding to required processing performance, thus allowing reducing or optimizing circuit size.

FURTHER INFORMATION ABOUT TECHNICAL BACKGROUND TO THIS APPLICATION

The disclosure of Japanese Patent Application No. 2009-041568 filed on Feb. 24, 2009 including specification, drawings and claims is incorporated herein by reference in its entirety.

The disclosure of PCT application No. PCT/JP2009/003857 filed on Aug. 11, 2009, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 5 is a diagram showing an example of data managed by a third OS according to the first embodiment of the present invention;

FIG. 16 is a diagram showing a configuration of a physical protection register according to the second embodiment of the present invention;

FIG. 18 is a diagram showing a configuration of a protection violation register according to the second embodiment of the present invention;

FIG. 19 is a diagram showing a configuration of an error address register according to the second embodiment of the present invention;

FIG. 22A is a diagram showing a configuration of a way specification register according to the second embodiment of the present invention;

FIG. 22B is a diagram showing the configuration of the way specification register according to the second embodiment of the present invention;

FIG. 25 is a diagram showing a configuration of an interrupt control register according to the second embodiment of the present invention;

DESCRIPTION OF THE PREFERRED EMBODIMENTS (First Embodiment)

A processor apparatus according to the present embodiment is a processor apparatus which shares a hardware resource between a plurality of processors, and includes: a first determination unit which determines whether or not a register in the hardware resource holds extension context data of a program that is currently executed; a second determination unit which determines to which processor the extension context data in the hardware resource corresponds; a first transfer unit which performs save and restore of the extension context data between programs in the processor; and a second transfer unit which performs save and restore of the extension context data between programs between different processors.

Figure 1:
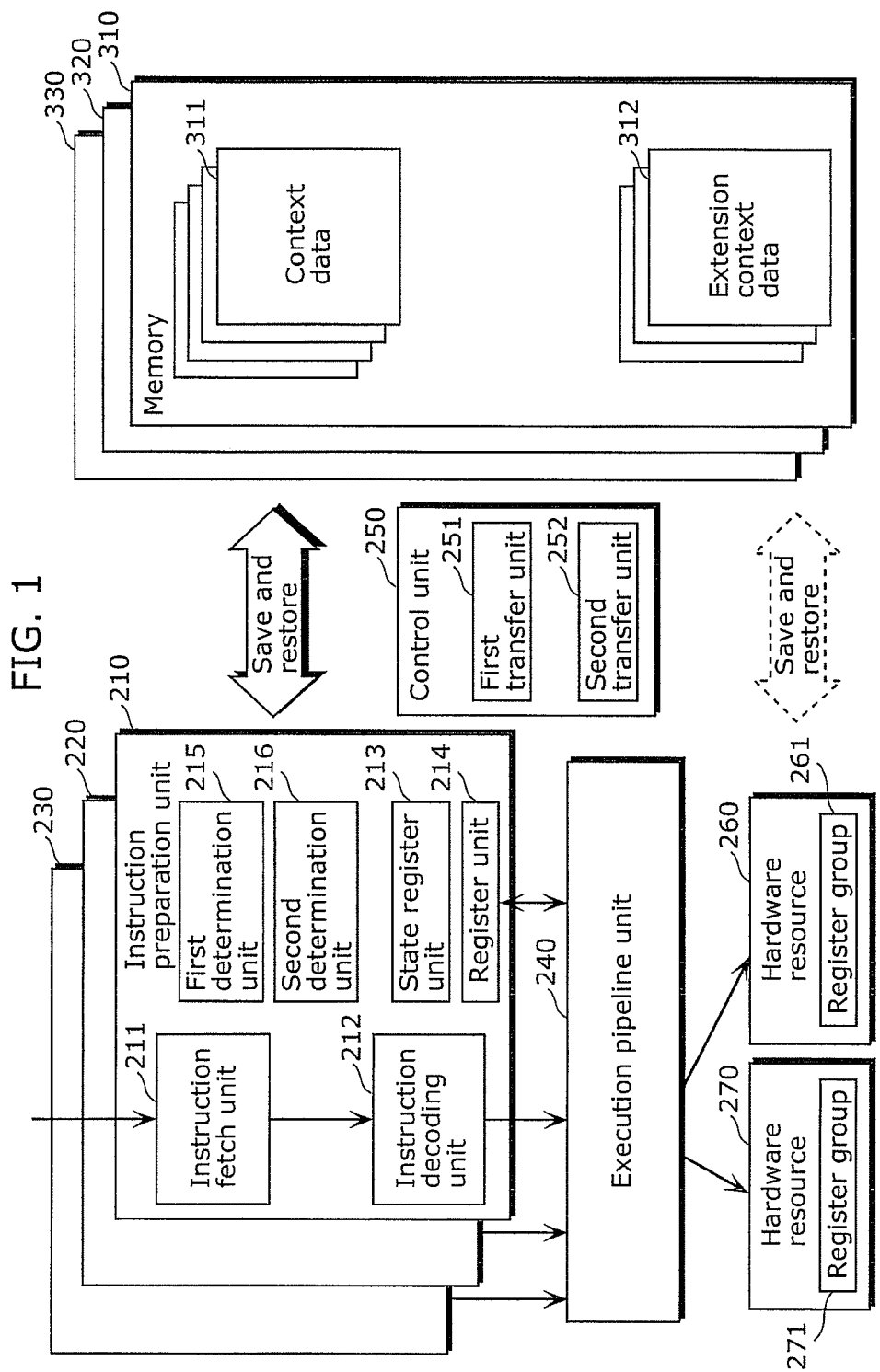
FIG. 1 is a block diagram showing a configuration of a processor apparatus according to a first embodiment of the present invention.

FIG. 1 is a block diagram showing a configuration of a processor apparatus according to the first embodiment of the present invention. The processor apparatus includes: instruction preparation units 210, 220, and 230; an execution pipeline unit 240; a control unit 250; hardware resources 260 and 270; and memories 310, 320, and 330.

The instruction preparation units 210, 220, and 230 and the execution pipeline unit 240 are included in the multithread processor. Each of the instruction preparation units 210, 220, and 230 independently fetches and decodes an instruction from a thread (program), and issues a result of the decoding to the execution pipeline unit 240.

The execution pipeline unit 240 includes a plurality of function units (ALU, a load/store unit, a branch processing unit, a multiplier, a divider, and so on), and executes, by the function units, an executable instruction from among a plurality of results of the instruction decoding. Since a pair of one of the instruction preparation units and the execution pipeline unit 240 virtually functions as one processor, the pair is called a virtual processor or logical processor. In other words, the instruction preparation units 210, 220, and 230, and the execution pipeline unit 240 correspond to three virtual processors 0 to 2. Each virtual processor executes programs, switching the programs. Note that instead of the instruction preparation units 210, 220, and 230 and the execution pipeline unit 240, a plurality of physical processors which independently operate from each other may be included. Hereinafter, when it is not particularly necessary to distinguish three virtual processors 0 to 2 (logical processors) from three logical processors, these processors are simply called processors 0 to 2.

Each memory 310, 320, and 330 has an address space for a corresponding one of the three processors. The memory 310 stores: a program, normal context data 311 of the program, extension context data 312 of the hardware resource, and so on. The same is applicable to the memories 320 and 330. The three memories 310, 320, and 330 have one physical address space and three independent virtual address spaces. Note that the three memories 310, 320, and 330 may have three independent physical address spaces. In addition, the context data 311, 321, and 331 may be stored in a separate dedicated memory for the context data.

The instruction preparation unit 210 includes: an instruction fetch unit 211 which fetches an instruction from the memory 310; an instruction decoding unit 212 which decodes the fetched instruction; a state register unit 213; a register unit 214; a first determination unit 215; and a second determination unit 216.

The instruction preparation unit 220 includes: an instruction fetch unit 221 which fetches an instruction from the memory 320; an instruction decoding unit 222 which decodes the fetched instruction; a state register unit 223; a register unit 224; a first determination unit 225; and a second determination unit 226.

The instruction preparation unit 230 includes: an instruction fetch unit 231 which fetches an instruction from the memory 330; an instruction decoding unit 232 which decodes the fetched instruction; a state register unit 233; a register unit 234; a first determination unit 235; and a second determination unit 236.

The data in each of the state register unit 213 and the register unit 214 constitutes context data of the program that is currently executed. The same is applicable to the state register unit 223 and the register unit 224. The same is applicable to the state register unit 233 and the register unit 234.

The control unit 250 includes a first transfer unit 251 and a second transfer unit 252, and controls save and restore of the extension context data between each of the hardware resources 260 and 270 and each of the memories 310, 320, and 330.

The hardware resources 260 and 270 include, respectively, register groups 261 and 271 which hold the data, to complement the processors. Each hardware resource may be, for example, a floating point number processing unit (FPU), a hardware accelerator, and an extended calculation unit. The FPU executes a floating point number processing instruction (hereinafter referred to as an FPU instruction) in the program. The hardware accelerator receives a command from the processor and executes, on the specified data, product-sum operation, butterfly computation, quantization or inverse quantization of the block data, or the like at high speed. The extended calculation unit executes an extension instruction (multiply instruction, divide instruction, an instruction dedicated to the extended calculation unit, or the like) which cannot be directly executed by the processor.

Each of the register groups 261 and 271 holds a context (hereinafter, called extension context data) of a corresponding hardware resource. Each hardware resource is shared between a plurality of processors. Here, the save and restore of the extension context data is performed asynchronously with the save and restore of the context data of the program in each processor. In other words, the processor actually executes a predetermined instruction for using the hardware resource (the FPU instruction, command, and extension instruction as described above), and the context data thereof is saved and restored only when required.

The memory 310 stores context data 311 of each program on which time-division multiplexing is performed by a plurality of processors, and stores, for each program among a plurality of programs that includes the predetermined instruction for using the hardware resource, extension context data 312 that is a copy of register data in the hardware resource. Likewise, the memory 320 stores context data 321 and extension context data 322. The memory 330 stores context data 331 and extension context data 332.

The first determination unit 215 determines whether or not the register in the hardware resource holds the extension context data of the program that is currently executed, when the processor corresponding to the instruction preparation unit 210 attempts to execute a predetermined instruction in the program.

The second determination unit 216 determines whether or not the extension context data in the hardware resource belongs to the processor that attempts to execute the predetermined instruction.

The first transfer unit 251 saves the extension context data from the hardware resource to one of the memories 310, 320, and 330, according to results of the determination by the first and the second determination units 215 and 216, and restores context data belonging to the same processor (or the same memory) that the saved context data belongs to. After the restore, the hardware resource 260 or 270 executes the current predetermined instruction.

The second transfer unit 252 saves the extension context data from the hardware resource to one of the memories 310, 320, and 330, according to the results of the determination by the first and the second determination units 215 and 216, and restores the context data belonging to a processor (or different memory) different from the processor or a memory that the saved context data belongs to. After the restore, the hardware resource 260 or 270 executes the predetermined instruction.

The hardware resource 260 or 270 promptly executes the predetermined instruction without waiting for the save and restore of the extension context data, when the first determination unit 215 determines that the register in the hardware resource holds the extension context data of the currently-executed program, and when the second determination unit 216 determines that the extension context data in the hardware recourse belongs to the processor that attempts to execute the predetermined instruction.

With this configuration described above, it is possible to share each hardware resource 260 or 270 between the plurality of processors. In other words, any processor is able to use each hardware resource. This accordingly increases use efficiency of the hardware resource. In addition, since this does not require providing a hardware resource for each processor, it is only necessary to provide a minimum number of hardware resources corresponding to required processing performance, thus reducing or optimizing circuit size.

Figure 2:
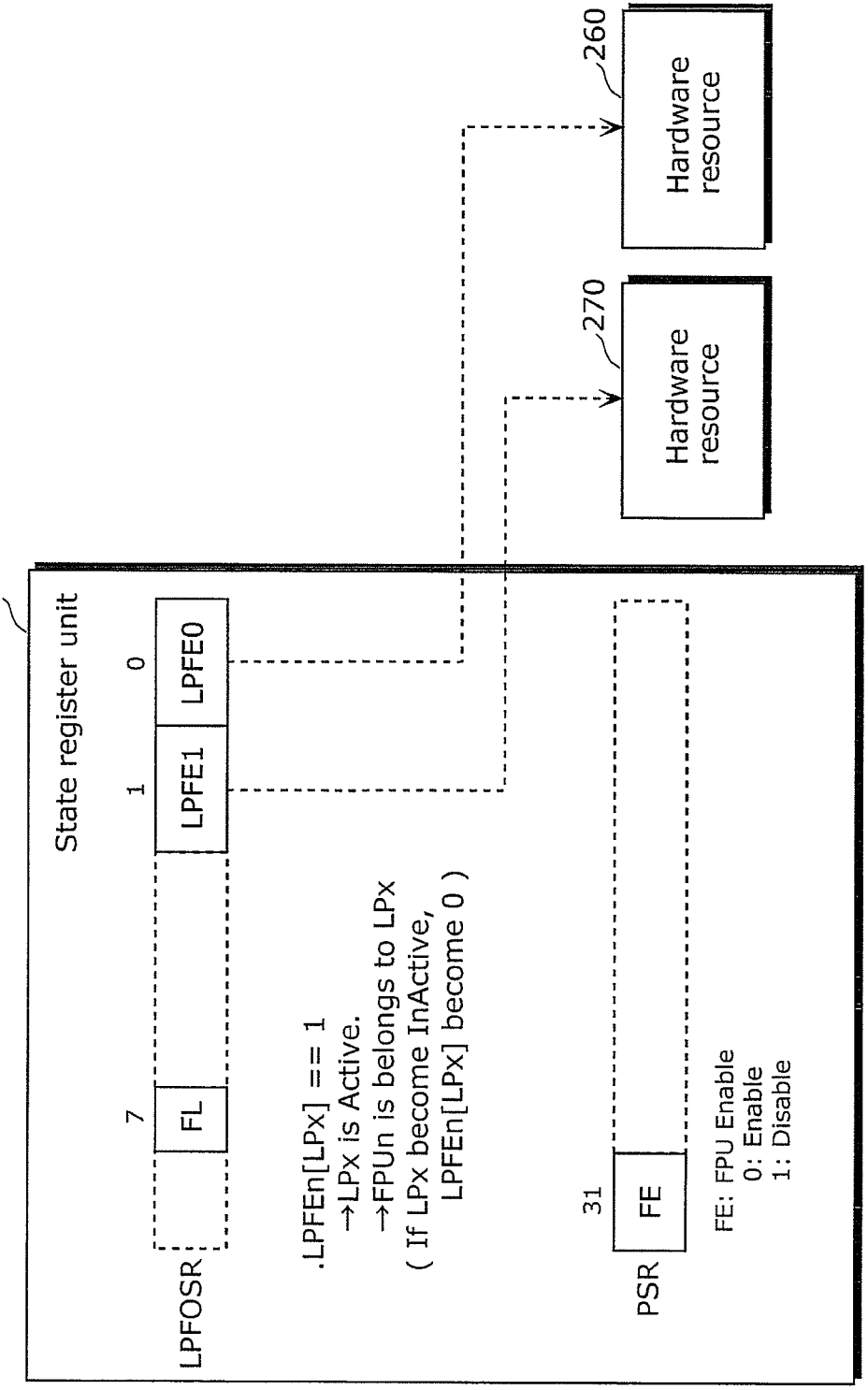
FIG. 2 is a diagram showing an example of first to third state information in a state register unit according to the first embodiment of the present invention.

FIG. 2 is a diagram showing an example of first to third state information in a state register unit according to the first embodiment.

The figure shows part of the state register unit 213, 223, or 233. Here, the state register unit 213 is described as representative. The state register unit 213 includes a register called a processor status register (PSR), and a register called a logical processor FPU operation status register (LPFOSR). Of these, the PSR is included in the context data 311 of the program. The LPFOSR is either included in the context data 311 of the program or managed by a separate OS instead of being included in the context data 311 of the program.

The PSR includes an FPU enable (FE) bit as the first state information indicating the possibility that the extension context data of the currently-executed program is held in the hardware resource.

The LPFOSR includes a logical processor FPU enable 0 (LPFE0) bit and an LPFE1 bit as the second state information indicating a processor corresponding to the extension context data held in the hardware resource. Only one bit of the LPFE0 and LPFE1 bits exclusively becomes "1" or both of the bits become "0". In this example, the LPFE0 bit corresponds to the processor 0, and the LPFE1 bit corresponds to the processors 1 and 2. The LPFOSR further includes the third state information (FL bit) indicating whether or not the second state information is to be locked or not.

In other words, when the FE bit of the PSR in the currently-executed program indicates the possibility that the extension context data is held in the hardware resource, and when LPFE0 or LPFE1 further indicates that the processor currently executing the program corresponds to the extension context data held in the hardware resource, the processor is allowed to use one of the hardware resources that is indicated by either LPFE0 or LPFE1.

The first determination unit 215 includes a first determination circuit (data determination unit) which determines whether the first state information is true or false when the corresponding processor attempts to execute the predetermined instruction in the program, and generates a first exceptional interrupt signal when determining that the first state information is false.

The second determination unit 216 includes a second determination circuit (processor determination unit) which determines, when the first determination circuit determines that the first state information is false, whether or not the corresponding processor matches the processor indicated by the second state information, and generates a second exceptional interrupt signal when determining that the second state information indicates that the corresponding processor does not match the indicated processor. The first and the second determination circuits are configured with hardware. This increases processing speed particularly when switching of the extension context data is not necessary.

Figure 3:
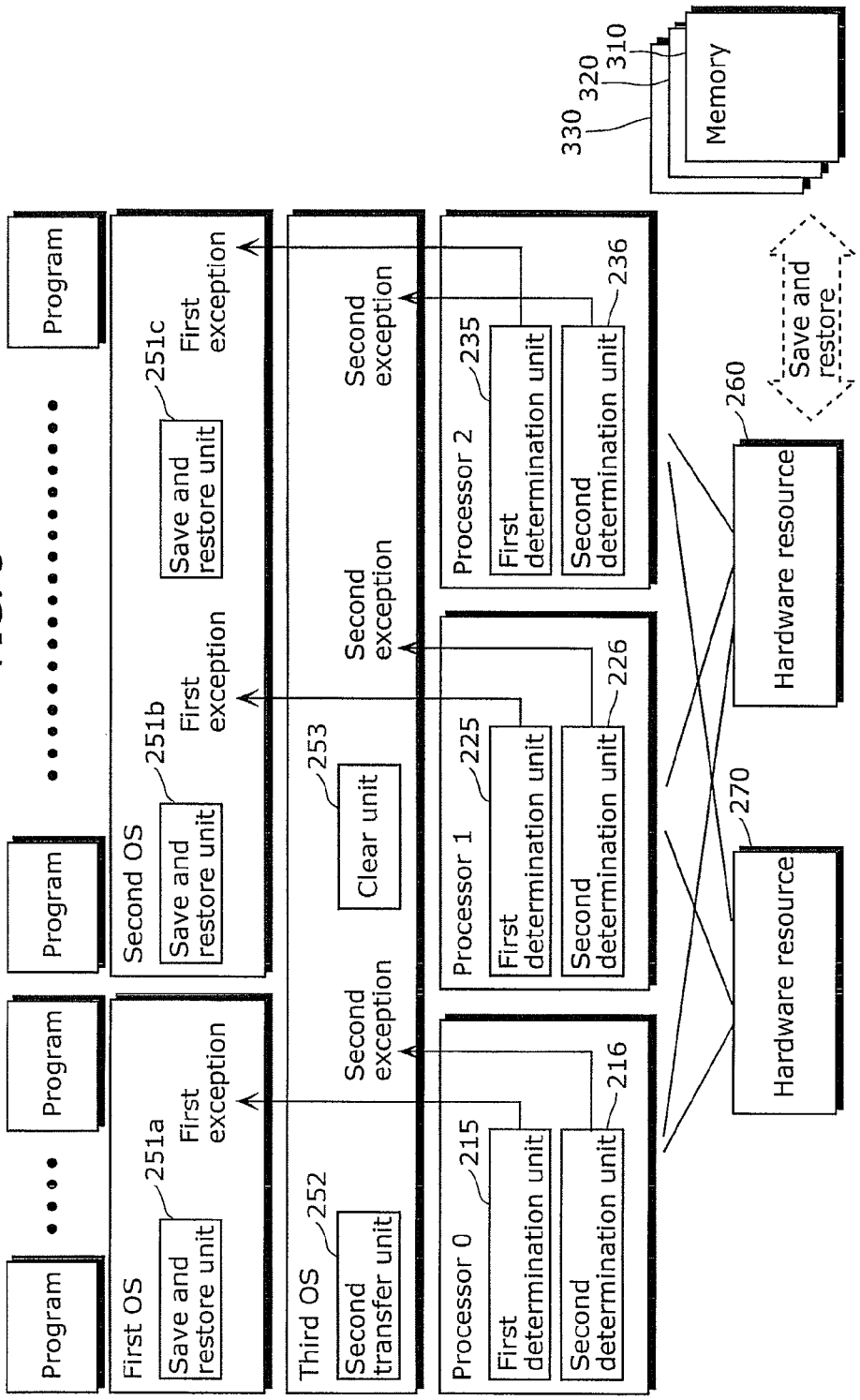
FIG. 3 is an explanatory diagram of an operation system in a processor apparatus according to the first embodiment of the present invention.

FIG. 3 is an explanatory diagram of an operation system in the processor apparatus according to the first embodiment of the present invention.

In the figure, processors 0 to 2 correspond to the three virtual processors or three physical processors shown in FIG. 1.

The processor 0 performs a plurality of programs by time-division multiplexing by executing a first operating system (hereinafter, abbreviated as OS).

The processors 1 and 2 perform a plurality of programs by time-division multiplexing by executing a second OS that is different from the first OS. The first OS is, for example, Linux, and the second OS is, for example, Real-time operating system (OS).

The first transfer unit 251 includes save and restore units 251*a*, 251*b*, and 251*c* provided for each processor. When the first exceptional interrupt signal is generated, each save and restore unit saves the extension context data to the memory from the hardware resource, and restores, from the memory to the hardware resource, the extension context data of the processor that has attempted to execute the predetermined instruction, and the save and restore unit 251*a* in the processor 0 is activated by the first OS when the first determination unit 215 in the processor 0 generates the first exceptional interrupt signal.

Each of the save and restore units 251*b* and 251*c* in the processors 1 and 2 is activated by the second OS when a corresponding one of the first determination units 225 and 235 in the processors 1 and 2 generates the first exceptional interrupt signal.

At least one of the processors 0 to 2 controls the second transfer unit 252 by executing a third OS which manages the first OS and the second OS. In other words, the second transfer unit 252 is activated by the third operating system when the second determination unit in one of the processors generates the second exceptional interrupt signal. The second transfer unit 252, when activated, atomically performs operation, from start of saving the extension context data belonging to another processor from the hardware resource to one of the memories 310, 320, and 330, to completion of restoring, from the memory to the hardware resource, the extension context data of the processor that has attempted to execute the predetermined instruction. With this, it is possible to share the hardware resource between different processors without causing contradiction in the context data of each program (particularly first state information and second state information) and without interference from another processor.

Furthermore, the third OS controls a clear unit 253. The clear unit 253 is a generic term for a clear circuit provided for each processor. Each clear circuit, when the processor corresponding to the clear circuit moves into one of stop, wait, and sleep states, clears the second state information (LPFE0 and LPFE1 bits) corresponding to the processor. This allows releasing the hardware resource currently used by the processor, and increasing use efficiency of the hardware resource shared between the processors. However, when the third state information (FL bit) is set (where FL=1), the operation of the clear circuit is inhibited. With this, when the processor using the hardware resource is fixed or when a certain processor uses the hardware resource with priority, it is possible, by a programmer setting the third state information to "Lock", to let the processor continue occupying the hardware resource, thus reducing redundant save and restore of the extension context data.

Figure 4:
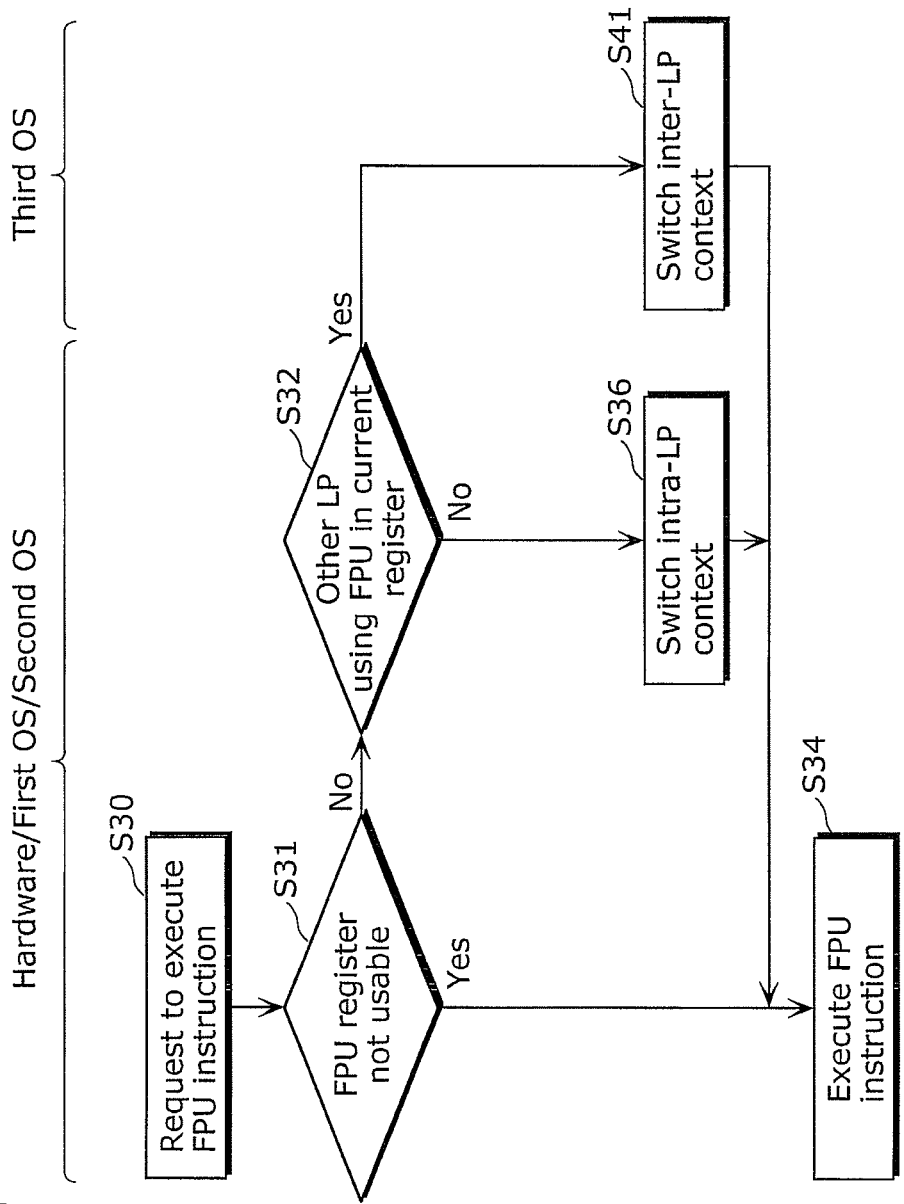
FIG. 4 is a flowchart showing a hardware resource switching operation according to the first embodiment of the present invention.

FIG. 4 is a flowchart showing a hardware resource switching operation according to the first embodiment. The figure shows an operation in one of the processors 0 to 2. Here, the description is given, assuming that the figure shows an operation of the processor 0 and the hardware resource is an FPU.

When the processor 0 attempts to execute an FPU instruction (when the processor 0 detects, by hardware, a request to execute the FPU instruction) (S30), it is determined whether or not an FPU register is usable (S31). The case where "the FPU register is not usable" is where FE=1 and LPFE0=1 (or LPFE1=1), which means that the FPU register holds the extension context data belonging to the program of the processor 0 that has issued the request to execute the FPU instruction. This determination is performed by the first and the second determination circuits almost without delay. In this case, the FPU instruction is promptly executed by an FPU which corresponds to one of LPFE0 and LPFE1 that indicates 1 (S34).

Furthermore, when "the FPU register is not usable", it is determined whether or not the FPU register holds extension context data belonging to another processor (S32). This determination is performed by the first and the second determination circuits.

When the FPU register holds extension context data that belongs to the same processor 0 but is not the extension context data of the program currently executed by the processor 0, that is, when the FE bit in the PSR of the processor indicates 1 but one of the LPFE1 and LPFE0 of the LPFOSR indicates 1, intra-LP context switching is performed (S36). The intra-LP (logical processor) context switching is performed by the first transfer unit 251.

When the FPU register holds extension context data belonging to the processor 1 or 2 that is different from the processor 0, that is, when both LPFE1 and LPFE0 of the LPFOSR indicate 0, inter-LP context switching is performed (S41). The inter-LP (logical processor) context switching is performed by the second transfer unit 252.

After the intra-LP or inter-LP context switching, the FPU promptly executes the FPU instruction (S34).

Among steps described above, steps S30, S31, and S32 are performed by hardware in the processor. The step S34 is performed by the FPU. The step S36 is performed by the first transfer unit 251 under the control of the first OS. The step S41 is performed by the second transfer unit 252 under the control of the third OS.

FIG. 5 is a diagram showing an example of data managed by the third OS according to the first embodiment.

A table T1 shown in the figure is a table which associates a processor ID (LPID here) with each hardware resource scheduled to be used (assumed here as an FPU0 and an FPU1). A table T2 is a table which associates a processor ID currently occupying the FPU (LPID) with a lock attribute (FL bit). The third OS constantly updates each of the tables T1 and T2 into the latest state, and manages the FPU in software terms.

The third OS, with reference to such tables, manages: (1) association between the FPU0 and FPU1 and the LPID (selection of the FPU that is to be newly allocated to the LP), (2) the LPID of the LP currently using the FPU0 and the FPU1, and (3) management of the lock attribute of the LP currently using the FPUn.

More specifically, (1) the third OS manages which FPUn each LP is scheduled to use (manages the FPUn scheduled to be used by each LP, using software), and determines which one of the LPFE0 and LPFE1 bits in the LPFOSR shown in FIG. 2 is to be set. In other words, it is possible to manage of which FPUn the context is to be used by each LP.

(2) The third OS, by managing the LPID currently using the FPU0 and the FPU1, manages which processor is currently using the FPU0 and the FPU1 and which processor is about to use the FPU0 and the FPU1, and manages context restore and save between LPs as an atomic operation.

(3) The third OS allows, using software, lock management of the LP using the FPUn, and allows managing the lock attribute of the FPUn using software. This allows the LP itself to lock the occupancy state of the FPU, and to remove the state from another LP.

Figure 6:
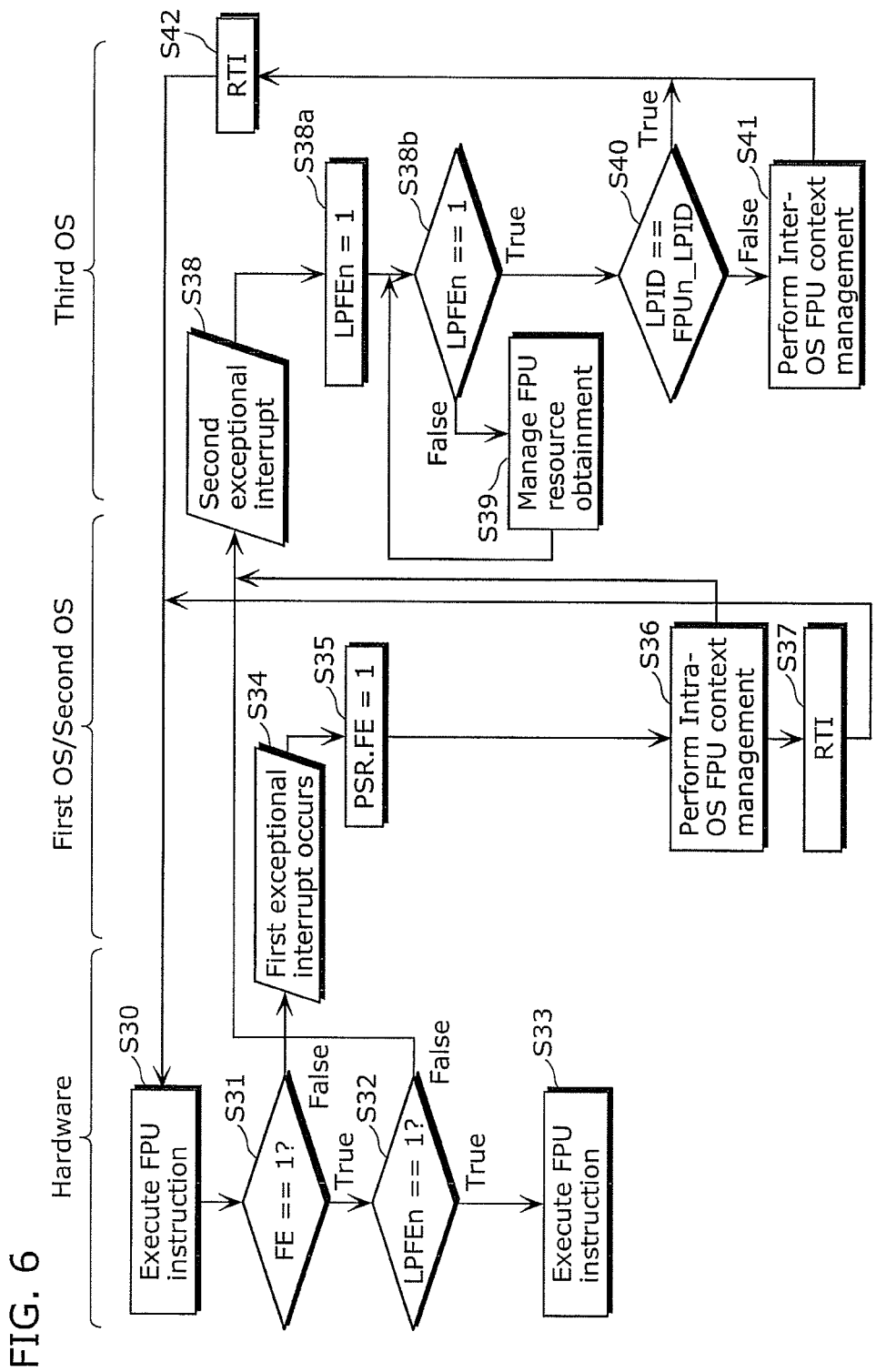
FIG. 6 is a detailed flowchart showing the hardware resource switching operation according to the first embodiment of the present invention.

FIG. 6 is a flowchart showing a hardware resource switching operation according to the first embodiment of the present invention. The figure separately shows: steps performed by the hardware of the processor; steps performed by the first OS or the second OS; and steps performed by the third OS. The figure shows an operation in one of the processors 0 to 3. Here, the description is given assuming that the figure shows an operation of the processor 0 and the hardware resource is the FPU.

When the processor 0 attempts to execute the FPU instruction (when the processor 0 detects, by hardware, the request to execute the FPU instruction)(S30), the first determination unit 215 determines whether or not the FPU register is not usable by determining whether the FE bit (first state information) in the PSR is true or false (S31), and the second determination unit 216 further determines which one of LPFE0 and LPFE1 bits (second state information) is true (S32). This means that when FE=1 and LOFE0=1, the FPU register holds the extension context data belonging to the program of the processor 0 which has issued the request to execute the FPU instruction. This determination is performed by the first determination circuit and the second determination circuit almost without delay. In this case, the FPU instruction is promptly performed by the FPU (S33).

In addition, the first determination unit 215 generates the first exceptional interrupt signal where FE=0 (when the FPU register is not usable) (S34). With this, the control is shifted to the first OS or the second OS (here, the first OS). The first OS, in order to secure the FPU (here assumed as the FPU0), sets FE=1 (S35), and attempts to perform save and restore of the context of the FPU within the OS as required. When the second determination unit 216 determines that the extension context data in the FPU0 belongs to the same processor, the first OS saves the extension context data from the FPU0 to the memory 310, and restores the extension context data of the program that has attempted to execute the FPU instruction that is currently executed (S36), and returns from interrupt processing (S37). With this, the program that has attempted to execute the FPU instruction passes through steps S31 (True) and S32 (True) without problem. With this, the FPU0 executes the FPU instruction.

On the other hand, the first OS sets FE=1 (S36) and attempts to save the extension context data in the FPU0, but when the second determination unit 216 determines that the extension context data in the FPU0 belongs to another processor, the second exceptional interrupt signal is generated (S38). With this, the control is shifted to the third OS.

The third OS, which has received the second exceptional interrupt signal, sets LPFE0=1 in order to secure a right to use the FPU0 (S38a) and determines whether or not the right to use the FPU0 is secured (S38b); when the right is secured, the third OS determines, with reference to the table T2, whether or not the processor currently occupying the FPU0 (FPU0-LPID) and the processor that has attempted to execute the FPU instruction are the same (S40), and when the processors are not the same, performs context exchange between different processors (S41), and leaves the interrupt processing (S42).

When the FPU0 cannot be secured in step S38b (where LPFE0=0 despite 1 being written into LPFE0, that is, the FPU0 is secured by another physical processor), the third OS enters wait processing until the FPU0 is released (S39). In this wait processing, whether or not the FPU0 is released may be checked by polling, event waiting, and so on.

In addition, in S40, when the processor currently occupying the FPU0 (FPU0-LPID) and the processor that has attempted to execute the FPU instruction are the same, it is not necessary to perform context exchange, thus leaving straight the interrupt processing. This case can happen when the FE bit is cleared when the program executed in the processor 0 once moves into a sleep state, stop state, or the like.

Of the processing described above, the operation of the third OS when receiving the second exceptional interrupt signal is described in further detail.

The third OS shown in FIG. 3, as part of the operating system, performs the second exceptional interrupt processing activated by the second exceptional interrupt signal from each of the second determination units 216, 226, and 236. The third OS includes, to support the second exceptional interrupt processing, obtainment processing for obtaining the hardware resource, and waiting processing for waiting the hardware resource to be released, and so on.

In the obtainment processing, when the hardware resource is not currently used in a virtual processor belonging to an instruction preparation unit that is other than an instruction preparation unit to which a virtual processor that has generated the second exceptional interrupt signal belongs (case 1), the third OS sets, in the state register in the instruction preparation unit that has generated the second exceptional interrupt signal, the first state information indicating true and the second state information indicating the processor that has generated the second exceptional interrupt signal. The first state information indicating true indicates that there is a possibility that the extension context data of the currently-executed program is held in the hardware resource. In the step S38b descried above, this case 1 corresponds to the case where it is determined that the right to use the FPU0 has been secured.

On the other hand, when the hardware resource is currently used in the virtual processor in the instruction preparation unit that is other than the instruction preparation unit to which the virtual processor that has issued the second exceptional interrupt signal belongs (case 2), the third OS executes the wait processing for waiting for the hardware resource to be released. In the step S38b descried above, this case 2 corresponds to the case where it is determined that the right to use the FPU0 cannot secured, and the process enters step S39 (wait processing).

In the step S38b, for the processing for obtaining the hardware resource, for example, the third OS may include and use a management object such as MUTEX for exclusive control of the resource.

As described above, with the processor apparatus according to the present embodiment, it is possible to share each hardware resource between a plurality of processors. In other words, any processor is able to use each hardware resource. This accordingly increases use efficiency of the hardware resource. Since this does not require providing the hardware resource for each processor, it is only necessary to provide a minimum number of hardware resources corresponding to required processing performance, thus allowing reducing or optimizing circuit size. With this configuration, it is possible to efficiently share, between the plurality of processors, the extended calculation unit such as an FPU or hardware accelerator, thus minimizing save and restore of the extension context data.

(Second Embodiment)

In the present embodiment, a configuration in the case of applying the processor apparatus described in the first embodiment to a media processor is described.

A processor system according to the present embodiment includes a single processor block which performs host processing and media processing by sharing resources. The processor block has the same function as the processor apparatus according to the first embodiment, and performs, sharing the resources, host processing and media processing using a single processor apparatus. The processor system according to the embodiment of the present invention assigns different tag information to each of threads for host processing and threads for media processing, and divides the resources of the processor system in association with the tag information. With this, the processor system according the second embodiment of the present invention allows enhancing performance assurance and robustness as well as increasing area efficiency.

First, a configuration of the processor system according to the second embodiment of the present invention is described.

Figure 7:
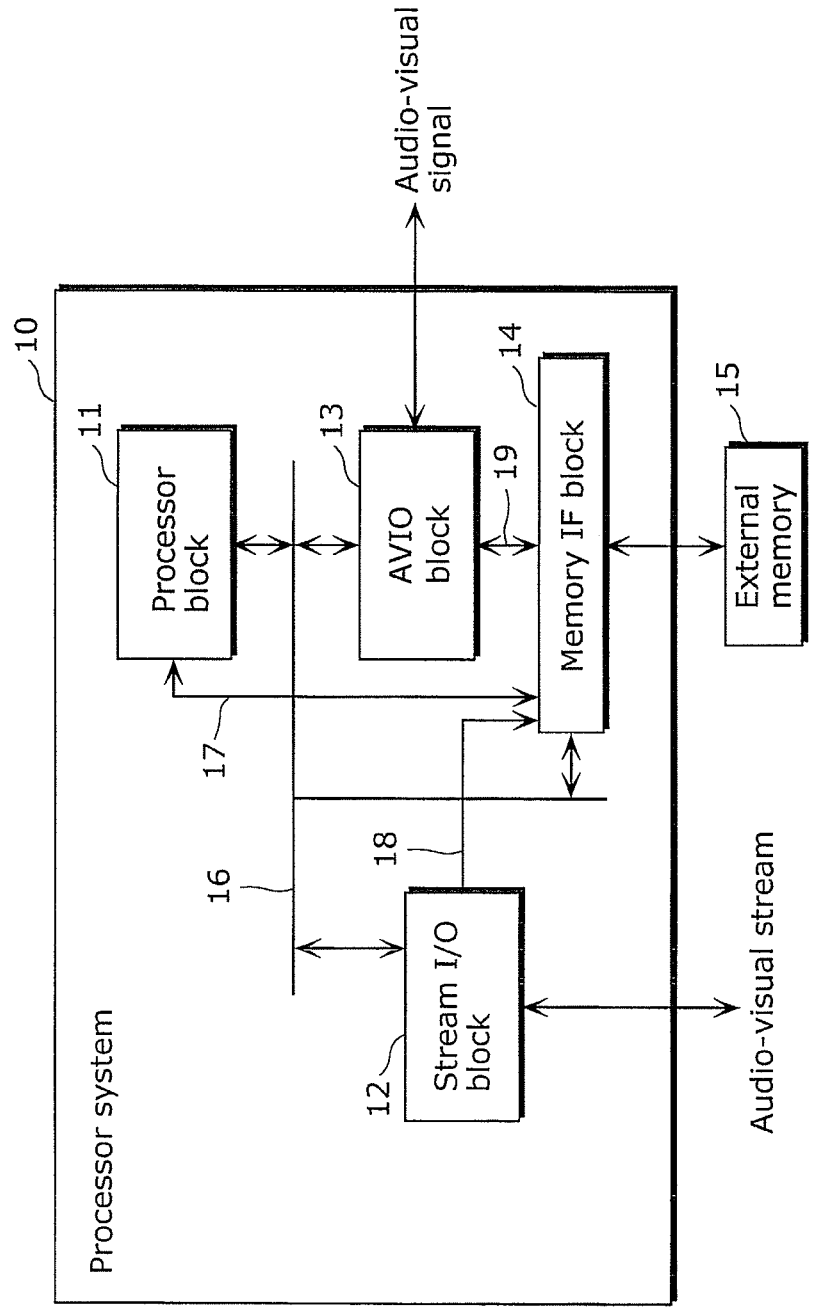
FIG. 7 is a block diagram showing a configuration of a processor system according to a second embodiment of the present invention.

FIG. 7 is a block diagram showing a configuration of a processor system 10 according to the second embodiment of the present invention.

The processor system 10 is a system LSI which performs a variety of signal processing related to an audio-visual stream, and performs a plurality of threads using an external memory 15. For example, the processor system 10 is incorporated in a digital television system, a DVD recorder, a digital camera, a cellular phone device, and so on. The processor system 10 includes: a processor block 11, a stream I/O block 12, an audio-visual input output (AVIO) block 13, and a memory IF block 14.

The processor block 11 is the same as the processor apparatus described in the first embodiment. The following description will focus on differences, omitting the descriptions of the same points.

The processor block 11 is a processor which controls an entire processor system 10, and controls the stream I/O block 12, the AVIO block 13, and the memory IF block 14 via a control bus 16, or accesses the external memory 15 via a data bus 17 and the memory IF block 14. In addition, the processor block 11 is a circuit block which: reads audio-visual data such as a compressed audio-visual stream from the external memory 15 via the data bus 17 and the memory IF block 14; and stores again, after performing media processing such as compression or decompression, processed image data or audio data in the external memory 15.

In other words, the processor block 11 performs host processing that is non-real time general-purpose (control-related) processing that is independent of an audio-visual output cycle (frame rate and so on) and media processing that is real-time general-purpose (media-related) processing that is dependent on an audio-visual output cycle.

For example, in the case of incorporating the processor system 10 in the digital television system, the digital television system is controlled by host processing, and digital video is decompressed by media processing.

The stream I/O block 12 is a circuit block which, under control by the processor block 11, reads stream data such as a compressed audio-visual stream from a peripheral device such as a storage media and a network, and stores the read stream data into the external memory 15 via the data bus 18 and the memory IF block 14 or performs stream transfer in an inverse direction. Thus, the stream I/O block 12 performs non-real time processing independent of the audio-visual output cycle.

The AVIO block 13 is a circuit block which, under the control of the processor block 11, reads image data, audio data, and so on from the external memory 15 via the data bus 19 and the memory IF block 14, and, after performing a variety of graphic processing and so on, outputs the processed data as an image signal and an audio signal to a display apparatus, a speaker, or the like that is provided outside, or performs data transfer in an inverse direction. Thus, the AVIO block 13 performs real-time processing dependent on the audio-visual output cycle.

The memory IF block 14 is a circuit block which performs control, under the control of the processor block 11, such that a data request is issued in parallel between each of the processor block 11, the stream I/O block 12, the AVIO block 13, and the memory 14, and the external memory 15. In addition, the memory IF block 14, in response to the request from the processor block 11, ensures a transfer bandwidth between each of the processor block 11, the stream I/O block 12, the AVIO block 13, and the memory IF block 14, and the external memory 15, as well as performing latency assurance.

Next, the configuration of the processor block 11 is described in detail.

Figure 8:
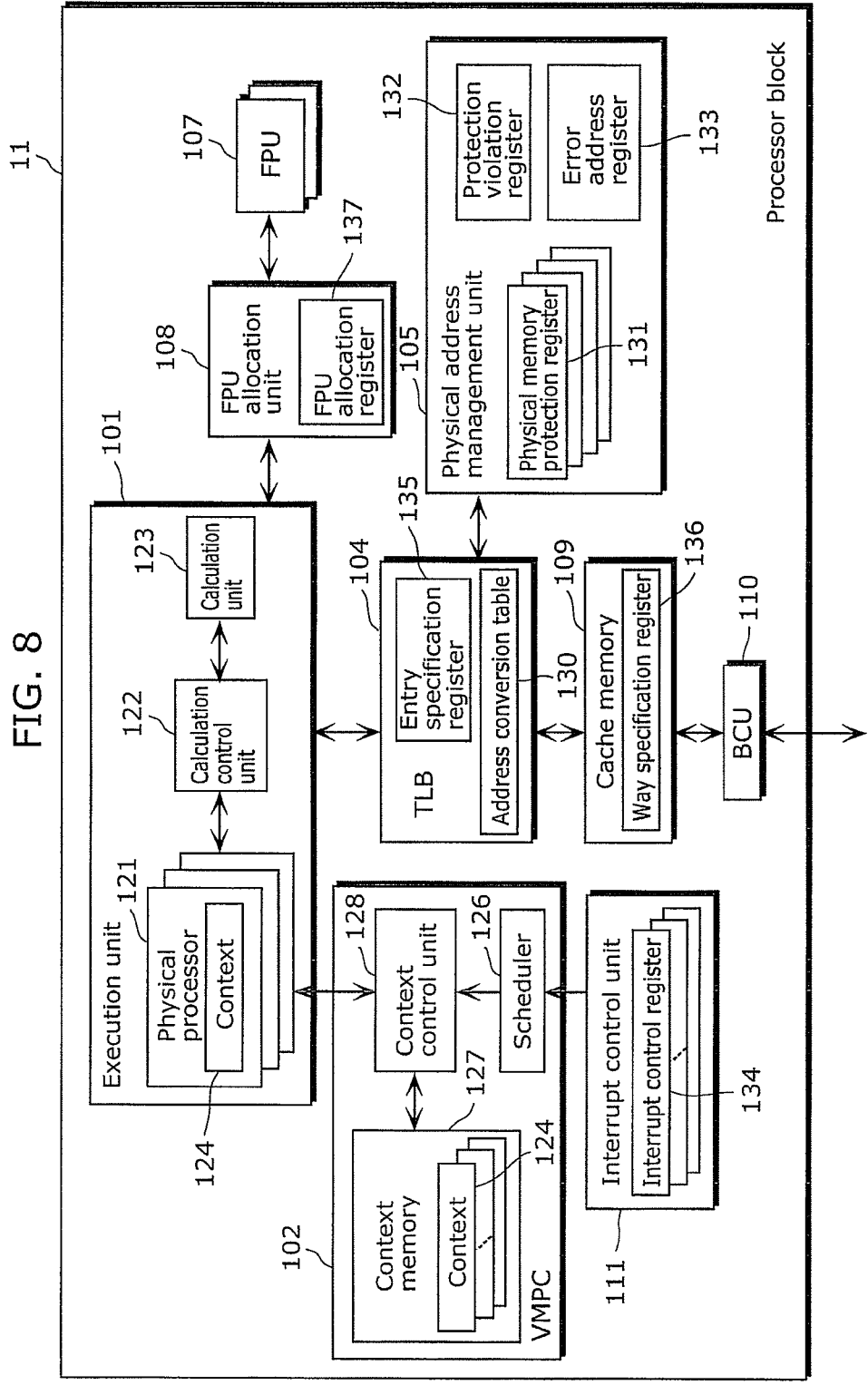
FIG. 8 is a block diagram showing a configuration of a processor block according to the second embodiment of the present invention.

FIG. 8 is a functional block diagram showing a configuration of the processor block 11.

The processor block 11 includes: an execution unit 101, a virtual multiprocessor control unit (VMPC) 102; a translation lookaside buffer (TLB) 104; a physical address management unit 105; a floating point number processing unit (FPU) 107; an FPU allocation unit 108; a cache memory 109, a BCU 110; and an interrupt control unit 111.

Here, the processor block 11 functions as a virtual multiprocessor (VMP). The virtual multiprocessor is generally a type of instruction parallel processor which performs, by time division, functions of a plurality of logical processors (LP). Here, one LP substantially corresponds to one context that is set for a register group for a physical processor (PP). Through control of a frequency of a time slot TS allocated to each LP, it is possible to keep a load balance between each application to be executed by each LP. Note that for a configuration and operation of the VMP, a representative example is disclosed in Patent Reference 3 (Japanese Unexamined Patent Application Publication No. 2003-271399), and thus detailed description thereof is omitted here.

In addition, the processor block 11 functions as a multithread pipeline processor (multithread processor). The multithread pipeline processor simultaneously processes a plurality of threads, and increases processing efficiency by processing the plurality of threads to fill a vacancy in an execution pipeline. Note that for a configuration and operation of the multithread pipeline processor, a representative example is disclosed in Patent Reference 4 (Japanese Unexamined Patent Application Publication No. 2008-123045), and thus detailed description thereof is omitted here.

The execution unit 101 simultaneously executes a plurality of threads. The execution unit 101 includes: a plurality of physical processors 121, a calculation control unit 122, and a calculation unit 123.

Each of the plurality of physical processors 121 includes a register. Each register holds one or more contexts 124. Here, the context 124 is control information, data information, and so on that correspond to each of the plurality of threads (LP) and are necessary for executing the corresponding thread. Each physical processor 121 fetches and decodes an instruction in the thread (program), and issues a decoding result to the calculation control unit 122.

The calculation unit 123 includes a plurality of calculators and simultaneously executes a plurality of threads.

The calculation control unit 122 performs pipeline control in the multithread pipeline processor. Specifically, the calculation control unit 122 allocates, first, the plurality of threads to a calculator included in the calculation unit 123 so as to fill the vacancy in the execution pipeline, and causes the threads to be executed.

The VMPC 102 controls virtual multithread processing. The VMPC 102 includes: a scheduler 126, a context memory 127, and a context control unit 128.

The scheduler 126 is a hardware scheduler which performs scheduling for determining, according to priority among the threads, an order of executing the threads and the PP that is to execute each thread. Specifically, the scheduler 126 switches the thread to be executed by the execution unit 101 by assigning or unassigning an LP to the PP.

The context memory 127 stores a plurality of contexts 124 each corresponding to one of the LPs. Note that the context memory 127 or a register included in each of the physical processors 121 corresponds to a holding unit according to the present invention.

The context control unit 128 performs what is called restore and save of context. Specifically, the context control unit 128 writes, into the context memory 127, the context 124 held by the physical processor 121 having completed an execution. In addition, the context control unit 128 reads, from the context memory 127, the context 124 of the thread that is to be executed, and transfers the read context 124 to the physical processor 121 assigned with the LP corresponding to the thread.

Figure 9:
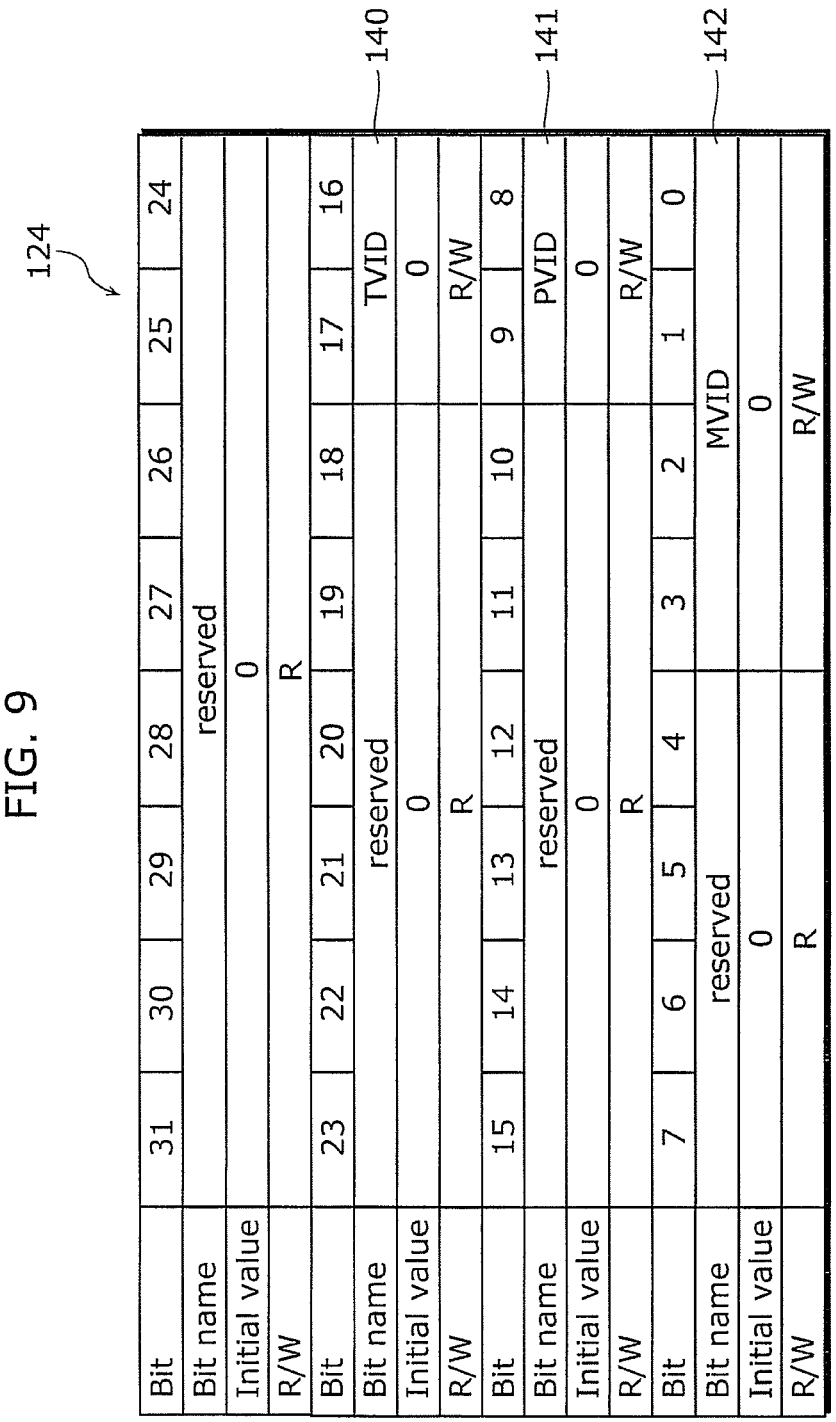
FIG. 9 is a diagram showing a context configuration according to the second embodiment of the present invention.

FIG. 9 is a diagram showing a configuration of one context 124. Note that FIG. 9 does not illustrate normal control information, normal data information, and so on that are necessary for executing the threads, but shows only the information newly added to the context 124.

As shown in FIG. 9, the context 124 includes: a TLB access virtual identifier (TVID) 140, a physical memory protection virtual identifier (PVID) 141, and a memory access virtual identifier (MVID) 142.

These TVID 140, PVID 141, and MVID 142 are tag information indicating whether each of the threads (LPs) belongs to host processing or media processing.

The TVID 140 is used for setting a plurality of virtual memory protection groups. For example, a different TVID 140 is assigned to each of the threads for host processing and the threads for media-processing. The execution unit 101 can generate, using the TVID 140, page management information in a logical address space for each of host processing and media processing, independently from each other.

The PVID141 is used for limiting an access to a physical memory region.

The MVID 142 is used for setting a mode of access to the memory IF block 14. The memory IF block 14 determines, using this MVID 142, whether priority is given to latency (with emphasis on responsiveness) or bus bandwidth (performance assurance).

Figure 10:
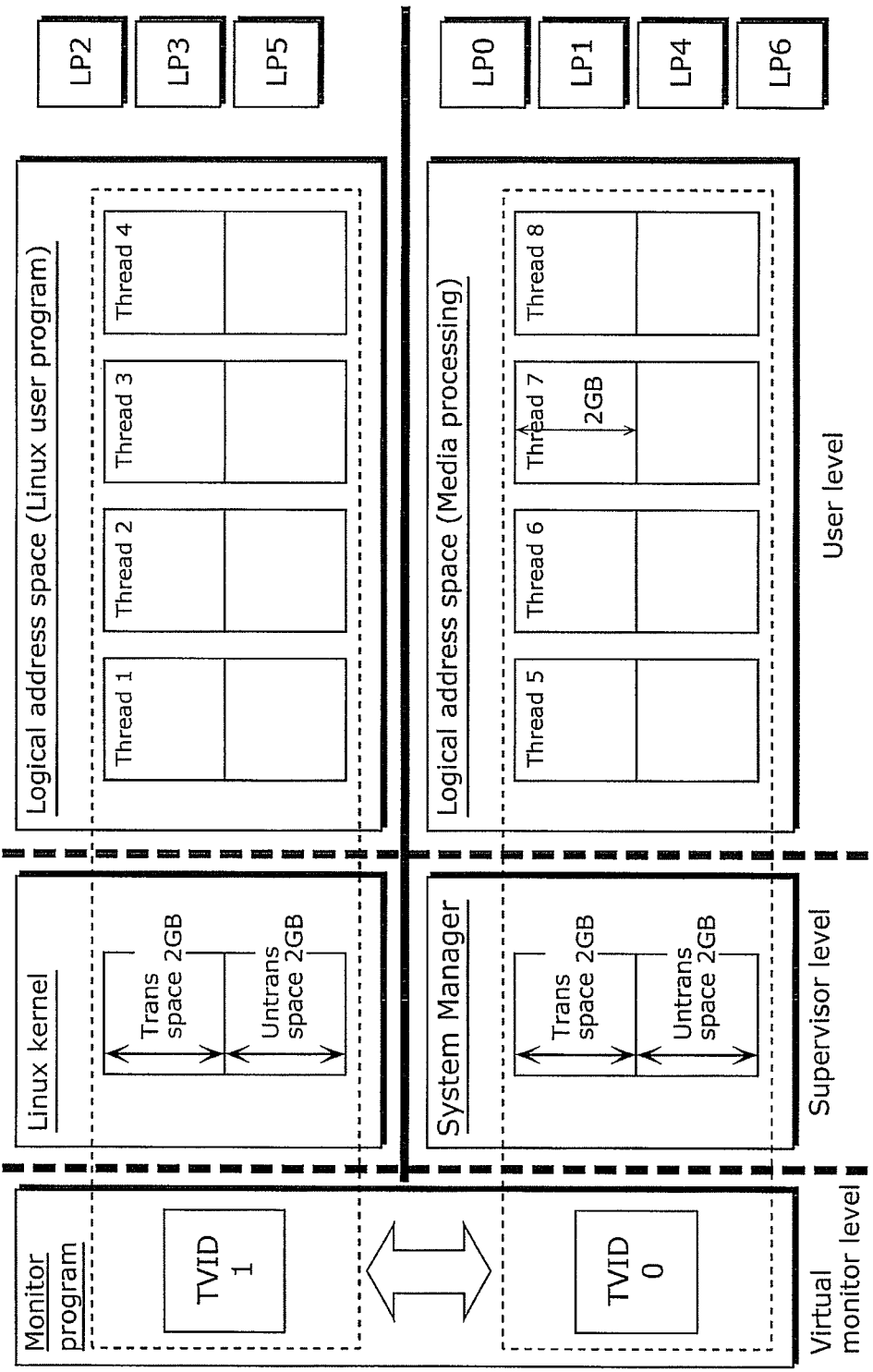
FIG. 10 is a diagram showing management of a logical address space according to the second embodiment of the present invention.

FIG. 10 is a diagram schematically showing management of the logical address space in the processor system 10. As shown in FIG. 10, the processor system 10 is controlled in three hierarchies: user level, supervisor level, and virtual monitor level.

Here, the user level is a hierarchy for performing control on each thread (LP). The supervisor level is a hierarchy corresponding to an operating system (OS) which controls a plurality of threads. For example, as shown in FIG. 10, the supervisor level includes: Linux kernel that is an OS for host processing, and System Manager that is an OS for media processing.

The virtual monitor level is a hierarchy for controlling a plurality of OS at the supervisor level. Specifically, the OS (monitor program) at the virtual monitor level distinguishes between logical address spaces, using the TVID 140. In other words, the processor system 10 manages the logical address spaces such that the logical address spaces used by the plurality of OS do not interfere with each other. For example, the TVID140, PVID 141, and MVID 142 of each context allows setting only at the virtual monitor level.

In addition, the OS at the virtual monitor level is a division unit according to the present invention, which divides the plurality of resources of the processor system 10 into: a first resource to be associated with threads belonging to host processing, and a second resource to be associated with threads belonging to media processing. Here, specifically, the resource is: a memory region of the external memory 15 (logical address space and physical address space); a memory region of the cache memory 109; a memory region of the TLB 104; and the FPU 107.

Thus, by dividing the resources at the virtual monitor level, a designer can design the OS for host processing and media processing in the same manner as in the case where host processing and media processing are executed by independent processors.

The TLB104 is a type of cache memory, and holds an address conversion table 130 that is part of a page table indicating a correspondence relationship between a logical address and a physical address. The TLB 104 performs conversion between the logical address and physical address, using the address conversion table 130.

Figure 11:
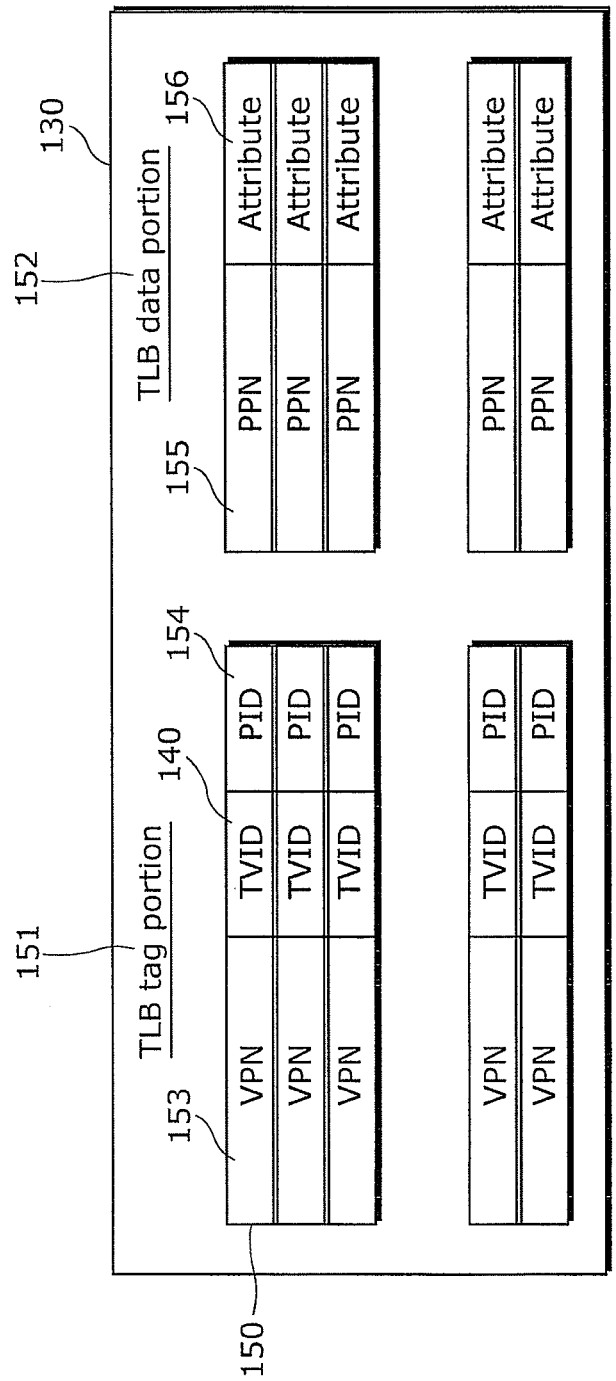
FIG. 11 is a diagram showing a configuration of an address management table according to the second embodiment of the present invention.

FIG. 11 is a diagram showing a configuration of the address conversion table 130.

As shown in FIG. 11, the address conversion table 130 includes a plurality of entries 150. Each entry 150 includes: a TLB tag portion 151 for identifying the logical address, and a TLB data portion 152 associated with the TLB tag portion 151. The TLB tag portion 151 includes: VPN 153, TVID 140, and PID 154. The TLB data portion 152 includes PPN 155 and Attribute 156.

The VPN 153 is a logical address at the user level, and is specifically a page No. of the logical address space.

The PID 154 is an ID for identifying a process using current data.

The PPN 155 is a physical address associated with the current TLB tag portion 151, and is specifically a page No. of the physical address space.

The Attribute 156 indicates an attribute of the data associated with the current TLB tag portion 151. Specifically, the Attribute 156 indicates: whether or not access to the current data is possible; whether or not the current data is to be stored in the cache memory 109; whether or not the current data has privilege; and so on.

In addition, the TLB 104 manages the logical address spaces used by the plurality of threads (LPs).

Figure 12:
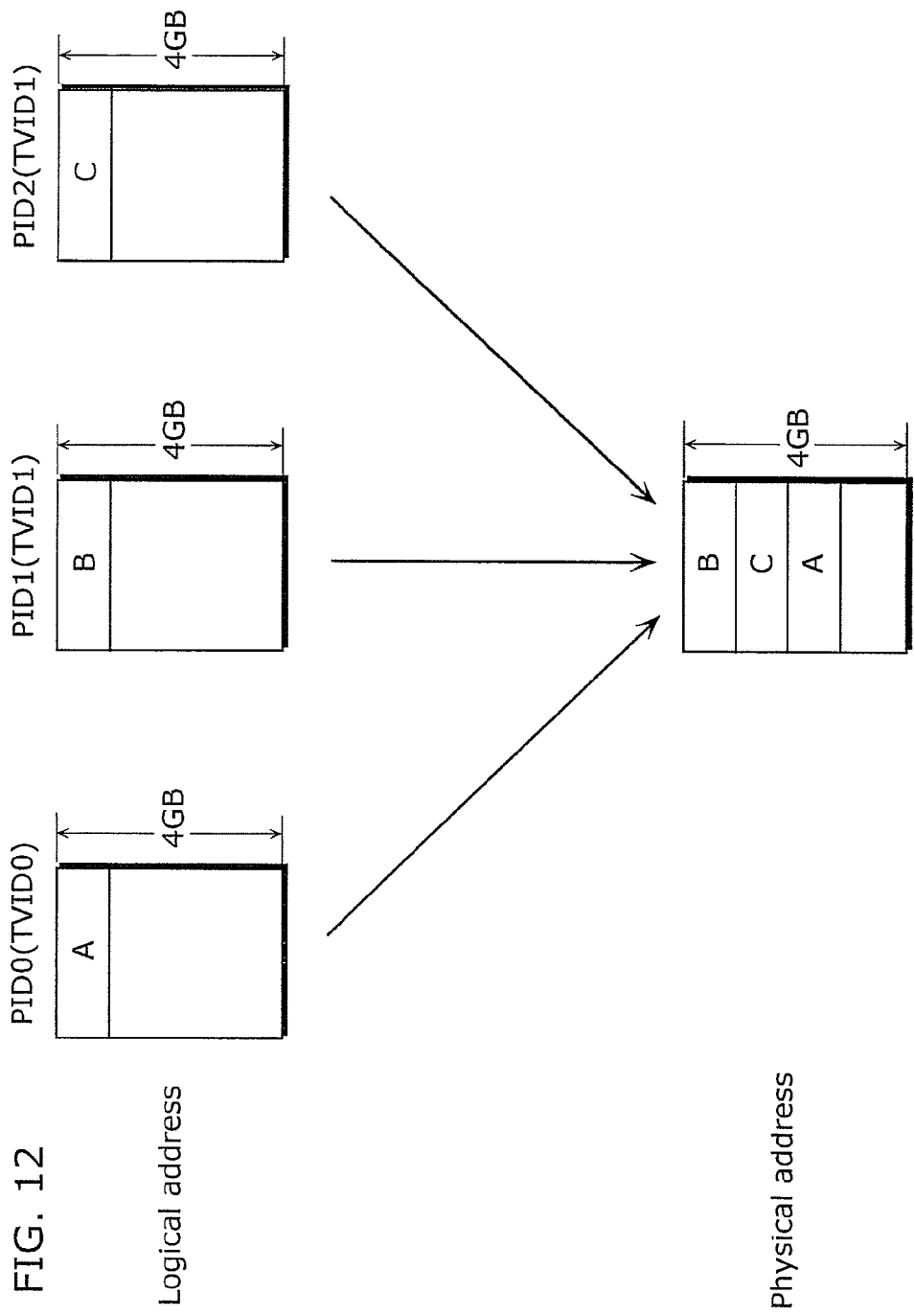
FIG. 12 is a diagram showing a correspondence relationship between a logical address and a physical address according to the second embodiment of the present invention.

FIG. 12 is a diagram schematically showing a correspondence relationship between the logical address and the physical address in the processor system 10. As described above, the TLB 104 associates one physical address (PPN155) with a set of the logical address (VPN153), the PID 154, and the TVID 140 for each process. Thus, at the supervisor level above the LPs having the same TVID, it is possible to distinguish first, at the supervisor level, the logical address of each process by associating one physical address with the set of the logical address (VPN153) and the PID 154 for each process, and then to associate the distinguished logical address with the physical address.

Here, in updating the TLB 104, a TVID which is set to the LP to be updated is set as the TVID 140 of the entry to be updated.

Furthermore, the TLB 104 associates one physical address (PPN155) with a set of the logical address (VPN153) and the PID 154 for each process, which includes the TVID 140. This allows the TLB 104 to assign, at the virtual monitor level, an independent logical address space to each of host processing and media processing, by setting a different TVID for each of host processing and media processing.

In addition, the TLB 104 includes an entry specification register 135. The entry specification register 135 holds information for specifying the entry 150 to be assigned to the TVID 140.

Figure 13:
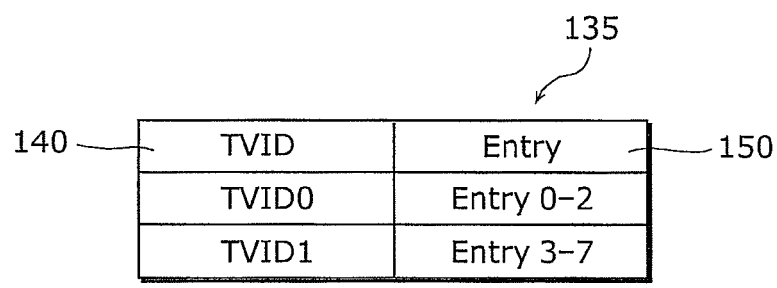
FIG. 13 is a diagram showing a configuration of an entry specification register according to the second embodiment of the present invention.

FIG. 13 is a diagram showing an example of data stored in the entry specification register 135. As shown in FIG. 13, the entry specification register 135 holds a correspondence relationship between the TVID 140 and the entry 150. In addition, the entry specification register 135 is set and updated by the OS (monitor program) at the virtual monitor level.

The TLB 104, using the information that is set for the entry specification register 135, determines the entries 150 to be used for each TVID 140. Specifically, the TLB 104 replaces the data of the entry 150 corresponding to the TVID 140 of an LP, in the case of TLB miss (when the address conversion table 130 does not hold the logical address (the TLB tag portion 151) that is input from the LP).

Figure 14:
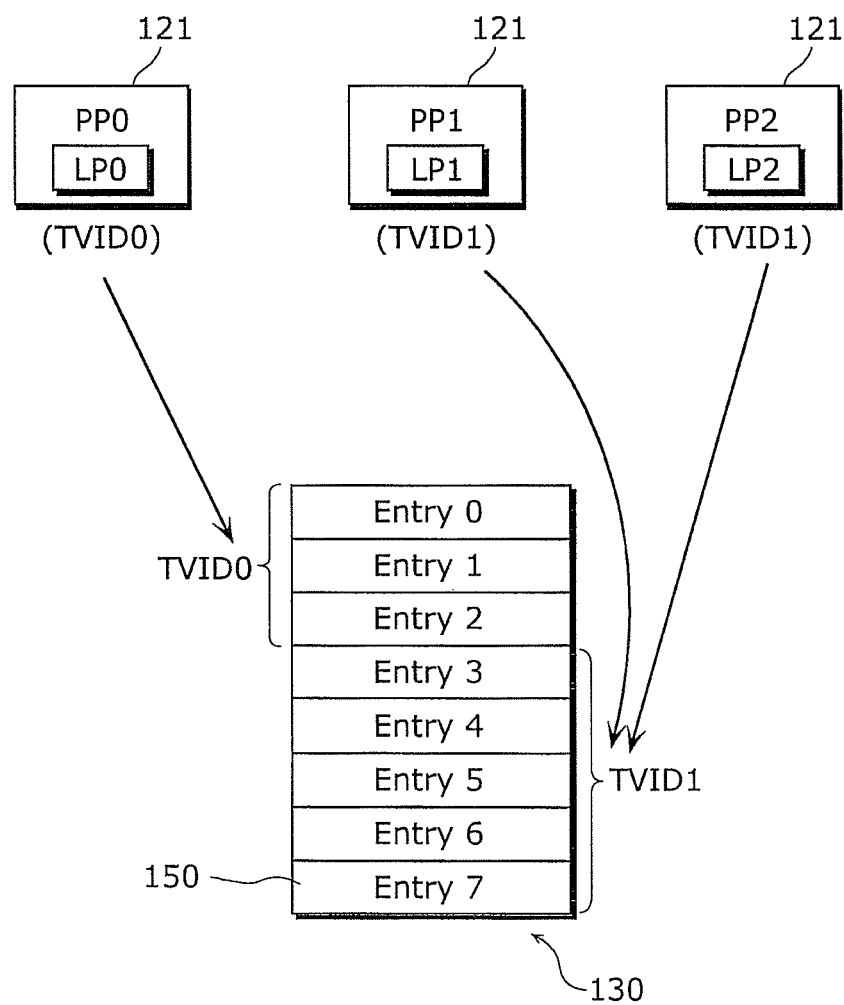
FIG. 14 is a diagram showing processing for allocating entries by a TLB according to the second embodiment of the present invention.

FIG. 14 is a diagram schematically showing an assignment state of the entries 150 in the TLB 104.

As shown in FIG. 14, the plurality of entries 150 are shared between a plurality of LPs. Furthermore, the TLB 104, using the TVID 140, causes the entries 150 to be shared between the LPs having the same TVID 140. For example, an LP0 having TVID0 is assigned with entries 0 to 2, and an LP1 and an LP2 having TVID1 are assigned with entries 3 to 7. This allows the TLB104 to use the entries 0 to 2 for threads belonging to host processing, and to use the entries 3 to 7 for threads belonging to media processing.

Figure 15:
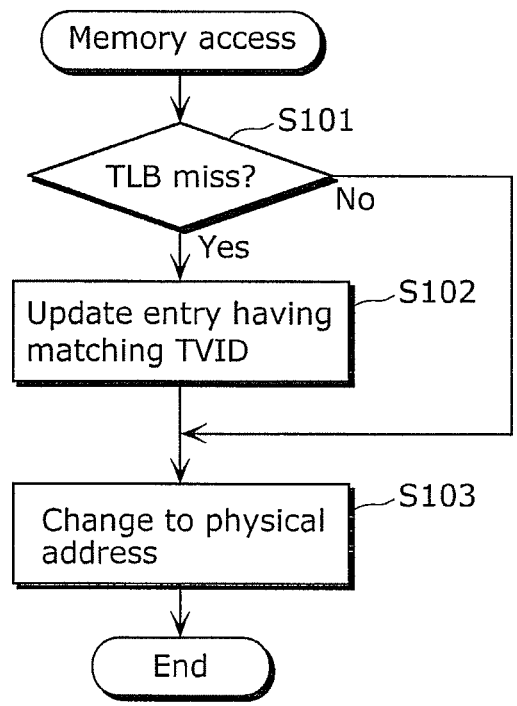
FIG. 15 is a flowchart showing a flow of processing by a TLB according to the second embodiment.

FIG. 15 is a flowchart showing a flow of processing by the TLB 104.

As shown in FIG. 15, in case of occurrence of an access from an LP to the external memory 15, the TLB 104 determines whether or not the TLB 104 stores a logical address that is the same as the logical address (VPN153, TVDE 140, and PID 154) input from the LP that is an access source (S101).

When the same logical address is not stored, that is, in the case of TLB miss (Yes in S101), the TLB 104 updates the entry 150 assigned to the TVID 140 of the LP that is the access source. In other words, the TLB 104 updates the entry 150 of the same TVID 140 as the TVID 140 of the access source LP (S102). Specifically, the TLB 104 reads, from a page table stored in the external memory 15 or the like, a correspondence relationship between the logical address and the physical address that are determined as the TLB miss, and stores the read correspondence relationship in the entry 150 assigned to the TVID 140 of the access source LP.

Next, the TLB 104 converts the logical address to the physical address, using the correspondence relationship that is updated (S103).

On the other hand, in step S101, when the same logical address as the logical address input from the LP is stored, that is, in the case of TLB hit (No in S101), the TLB 104 converts the logical address to the physical address, using the correspondence relationship that is determined as the TLB hit (S103).

Here, the page table stored in the external memory 15 or the like is generated in advance such that the physical address in the external memory 15 is assigned to each TVID 140 or each PVID 141. This page table is generated and updated by, for example, the OS at the supervisor level or the virtual monitor level.

The physical address management unit 105 performs access protection on the physical address space, using the PVID 141. The physical address management unit 105 includes: a plurality of physical memory protection registers 131, a protection violation register 132, and an error address register 133.

Each physical memory protection register 131 holds information indicating, for each physical address range, LPs that are accessible to the physical address range.

FIG. 16 is a diagram showing a configuration of the information held by one physical memory protection register 131. As shown in FIG. 16, the physical memory protection register 131 holds information including: BASEADDR 161; PS 162; PN 163; PVID0WE to PVID3WE 164; and PVID0RE to PVID3WE 165.

The BASEADDR 161, PS 162, and PN 163 are information indicating a physical address range. Specifically, the BASEADDR 161 is higher 16-bit of an initial address of the physical address range to be specified. The PS162 indicates a page size. For example, as a page size, 1 KB, 64 KB, 1 MB, or 64 MB is set. The PN 163 indicates the number of pages in the page size that is set for the PS 162.

PVID0WE to PVID3WE 164 and PVID0RE to PVID3RE 165 indicate the PVID 141 of an LP that is accessible to the physical address range specified by the BASEADDR 161, the PS 162, and the PN 163.

Specifically, each of the PVID0WE to PVID3WE 164 is provided, one bit for each PVID141. In addition, the PVID0WE to PVID3WE 164 indicate whether or not the LP assigned with a corresponding PVID 141 is able to write the data into the physical address range that is specified.

Specifically, each of the PVID0RE to PVID3RE 165 is provided, one bit for each PVID 141. In addition, the PVIO0RE to PVID3RE 165 indicate whether or not the LP assigned with a corresponding PVID 141 is able to read the data within the physical address range that is specified.

Note that it is assumed here that four types of PVID 141 are assigned to a plurality of LPs, but it is only necessary to assign two or more PVID 141 to the LPs.

Figure 17:
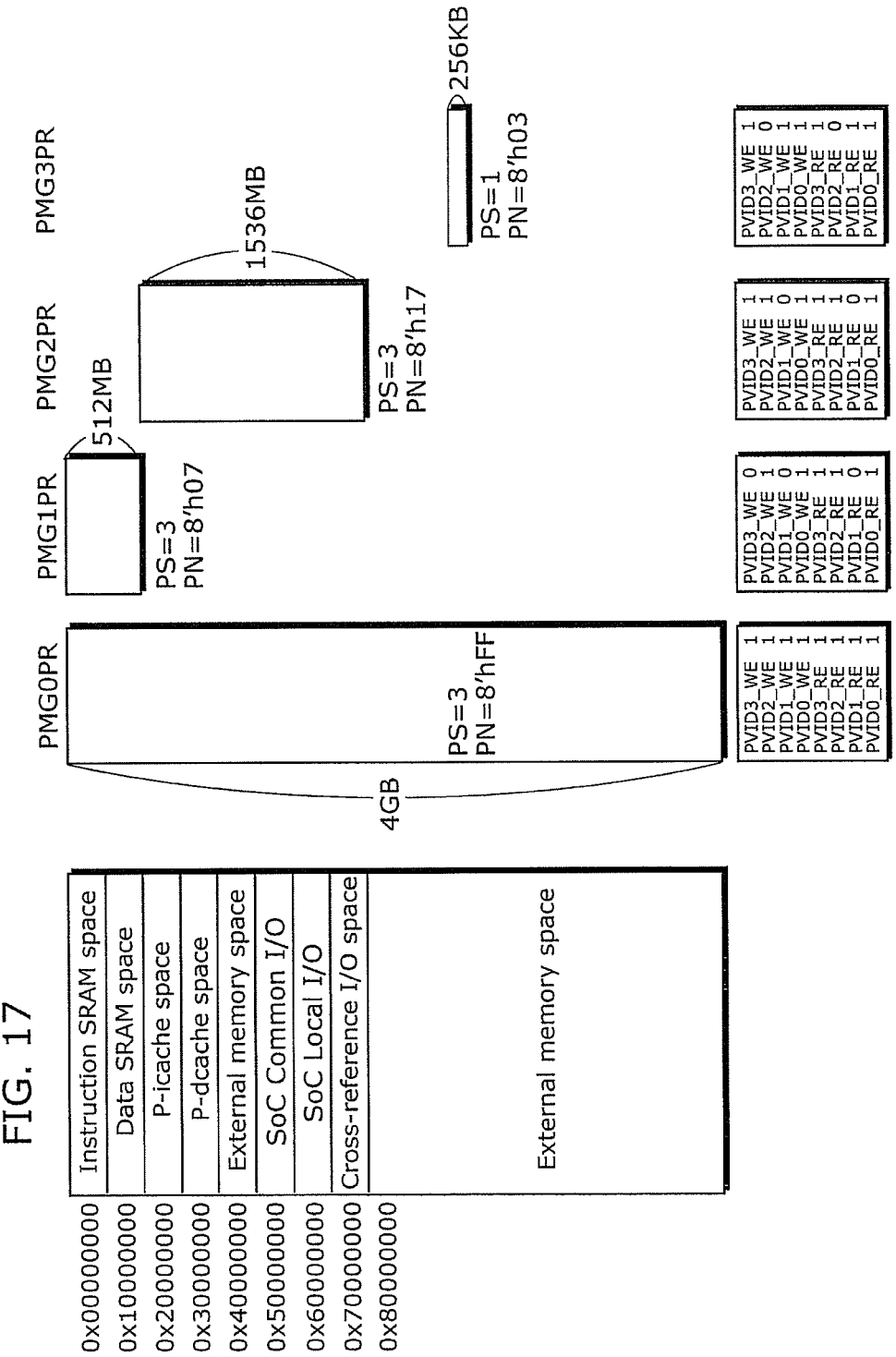
FIG. 17 is a diagram showing a physical address space protected by PVID according to the second embodiment of the present invention.

FIG. 17 is a diagram showing an example of the physical address space protected by the PVID141. In addition, it is assumed here that the physical address management unit 105 includes four physical memory protection registers 131 (PMG0PR to PMG3PR). In addition, PVID0 is assigned to an LP group for Linux (host processing), PVID1 is assigned to an LP group for image processing among the LPs for media processing, PVID 2 is assigned to an LP group for audio processing among LPs for media processing, and PVID3 is assigned to an LP group for System Manager (the OS for media processing).

In addition, the physical address management unit 105 generates an exceptional interrupt when an LP accesses a physical address that is not permitted by the PVID 141 of the LP, and writes, to the protection violation register 132, access information in which the error occurs, and also writes, to the error address register 133, a physical address of a destination of the access having caused the error.

FIG. 18 is a diagram showing a configuration of the access information held by the protection violation register 132. As shown in FIG. 18, the access information held by the protection violation register 132 includes: PVERR 167 and PVID 141. The PVERR 167 indicates whether or not the error is a protection violation of the physical memory space (an error caused by an LP having accessed the physical address that is not permitted by the PVID 141 of the LP). For the PVID 141, a PVID 141 in which the protection violation of the physical memory space has occurred is set.

FIG. 19 is a configuration of information held by the error address register 133. As shown in FIG. 19, the error address register 133 holds a physical address (BEA [31:0]) of the destination of the access that has caused the error.

As described above, by protecting the physical address using the PVID 141, it is possible to increase system robustness. Specifically, in debugging, the designer can easily determine which one of image processing and audio processing has caused the error, from the physical address in which the error has occurred or the PVID. In addition, in debugging host processing, it is possible to debug a failure occurring at an address that does not allow writing image processing or the like, without suspecting the failure in the image processing.

The FPU allocation unit 108 allocates a plurality of FPUs 107 to LPs. This FPU allocation unit 108 includes an FPU allocation register 137.

Figure 20:
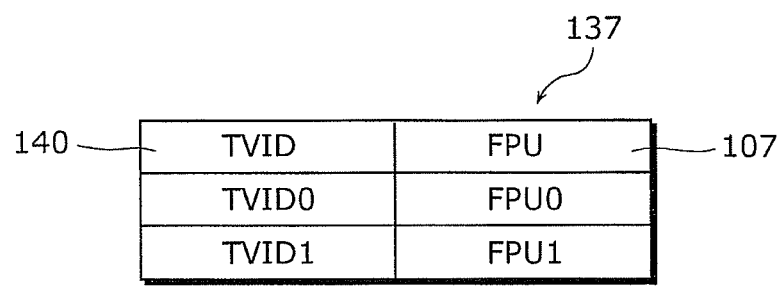
FIG. 20 is a block diagram showing a configuration of an FPU allocation register according to the second embodiment of the present invention.

FIG. 20 is a diagram showing an example of data stored in the FPU allocation register 137. As shown in FIG. 20, in the FPU allocation register 137, an FPU 107 is associated with each TVID 140. In addition, the FPU allocation register 137 is set and updated by the OS (monitor program) at the virtual monitor level.

Figure 21:
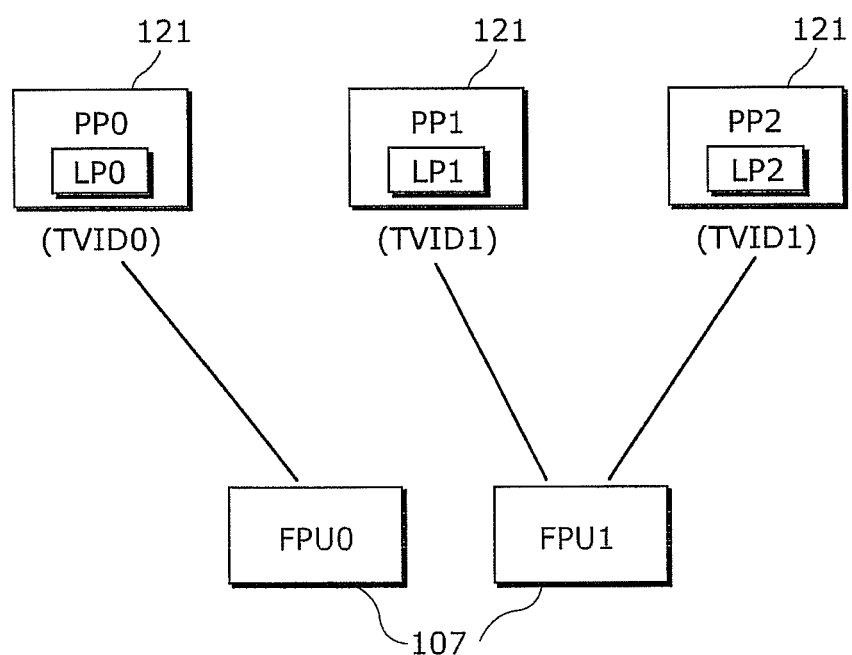
FIG. 21 is a diagram showing FPU allocation processing performed by an FPU allocation unit according to the second embodiment of the present invention.

FIG. 21 is a diagram schematically showing allocation processing of the FPU 107 by the FPU allocation unit 108.

As shown in FIG. 21, a plurality of FPUs 107 are shared by a plurality of LPs. Furthermore, the FPU allocation unit 108, using the TVID 140, causes the FPUs 107 to be shared between the LPs having the same TVID 140. For example, the FPU allocation unit 108 allocates the FPU0 to the LP0 having TVID0, and allocates the FPU1 to the LP1 and LP2 having TVID1.

In addition, the LP executes a thread, using the FPU 107 allocated by the FPU allocation unit 108.

The cache memory 109 is a memory which temporarily stores the data used for the processor block 11. In addition, for an LP having a different TVID 140, the cache memory 109 uses an independent and different data region (way 168). The cache memory 109 includes a way specification register 136.

FIGS. 22A and 22B are diagrams each showing an example of data stored in the way specification register 136.

As shown in FIG. 22A, the way specification register 136 is associated with a way 168 for each TVID 140. In addition, the way specification register 136 is set and updated by the OS (monitor program) at the virtual monitor level.

Note that as shown in FIG. 22B, the way 168 may be associated with each LP. In this case, for example, the context 124 includes information of the way used by the LP, and the OS at the virtual monitor level or the supervisor level sets and updates the way specification register 136 with reference to the context 124.

Figure 23:
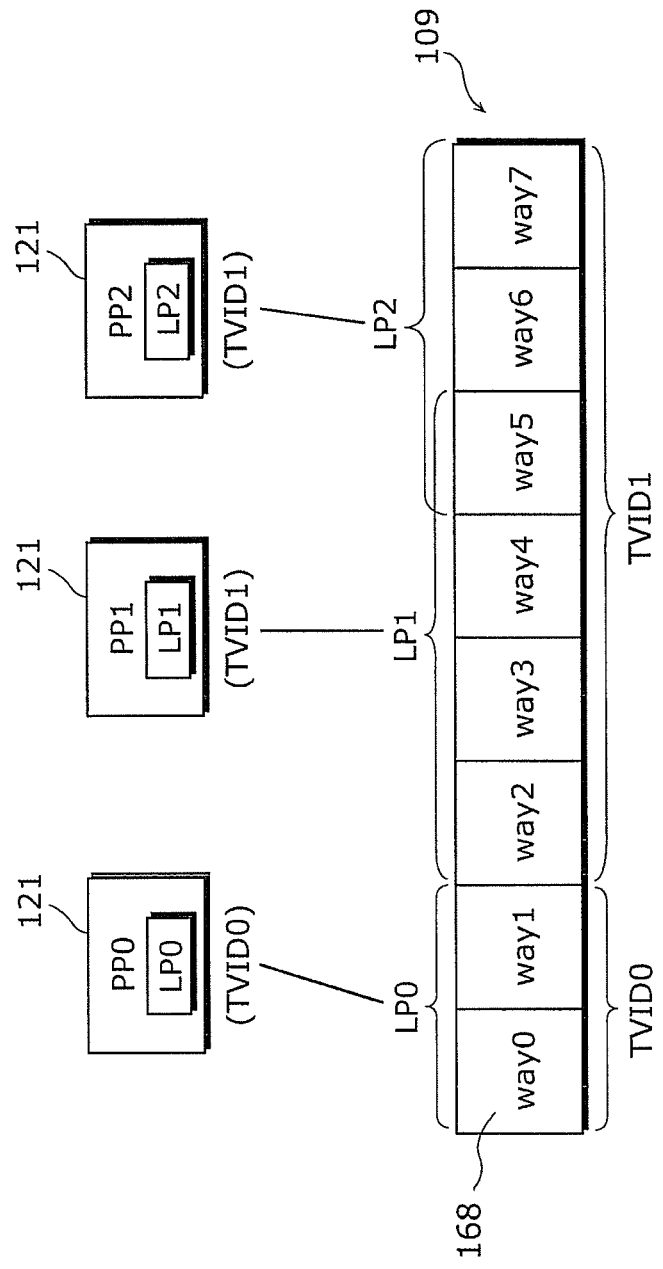
FIG. 23 is a diagram schematically showing way allocation processing performed by a cache memory according to the second embodiment of the present invention.

FIG. 23 is a diagram schematically showing the processing of allocating the way 168 performed by the cache memory 109.

As shown in FIG. 23, the cache memory 109 has a plurality of ways 168 (way0 to way7) as a unit of data storage. This cache memory 109 causes, using the TVID 140, the way 168 to be shared between LPs having the same TVID140. For example, the LP0 having TVID0 is assigned with way0 to way1, and the LP1 and LP2 having TVID1 are assigned with way2 to way7. With this, the cache memory 109 caches the data of threads belonging to host processing into a way0 to a way1, and caches the data of threads belonging to media processing into a way2 to a way7.

Thus, the cache memory 109 prevents the LPs having different TVIDs 140 from driving out the cache data of each other.

Figure 24:
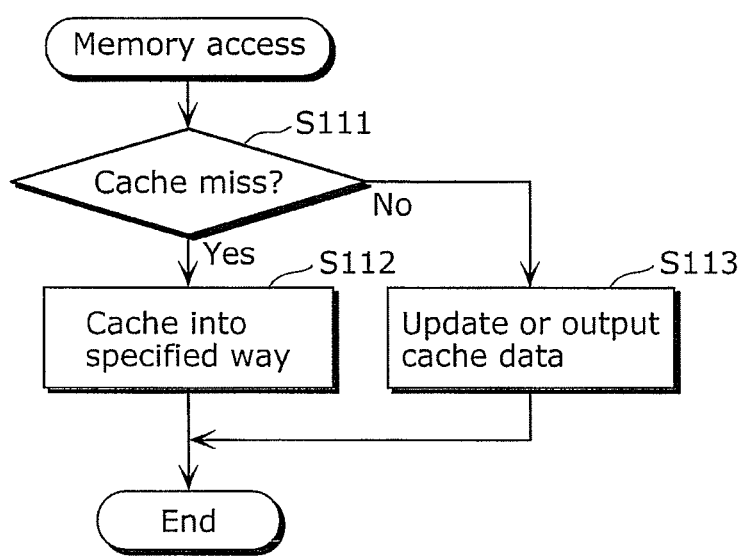
FIG. 24 is a flowchart showing a flow of processing by the cache memory according to the second embodiment of the present invention.

FIG. 24 is a flowchart showing a flow of processing by the cache memory 109.

As shown in FIG. 24, in case of occurrence of an access from an LP to the external memory 15, the cache memory 109 determines first whether or not the cache memory 109 stores the same address as an address (physical address) that is input from an access source LP (S111).

When the address is not stored, that is, in the case of cache miss (Yes in S111), the cache memory 109 caches, into the way 168 specified by the way specification register 136, the address and data that are input from the access source LP (S112). Specifically, in the case of read access, the cache memory 109 reads the data from the external memory 15 or the like, and stores the read data into the way 168 specified by the way specification register 136. In addition, in the case of write access, the cache memory 109 stores, into the way 168 specified by the way specification register 136, the data that is input from the access source LP.

On the other hand, in step S111, when the same address as the address input from the access source LP is stored, that is, in the case of cache hit (No in S111), the cache memory 109 updates the data that is determined as cache hit (at the time of write access) or outputs the cache-hit data to the access source LP (at the time of read access) (S113).

The BCU 110 controls a data transfer between the processor block 11 and the memory IF block 14.

The interrupt control unit 111 detects, requests, and permits an interrupt, and so on. The interrupt control unit 111 includes a plurality of interrupt control registers 134. For example, the interrupt control unit 111 includes 128 interrupt control registers 134. The interrupt control unit 111, with reference to the interrupt control registers 134, transfers an interrupt to a thread (LP) corresponding to an interrupt factor of the interrupt that has occurred.

To the interrupt control registers 134, a thread of the destination of the interrupt corresponding to the interrupt factor is set.

FIG. 25 is a diagram showing a configuration of one interrupt control register 134. The interrupt control register 134 shown in FIG. 25 includes: a system interrupt 171 (SYSINT), an LP identifier 172 (LPID), an LP interrupt 173 (LPINT), and an HW event 174 (HWEVT) that are associated with the interrupt factor.

The system interrupt 171 indicates whether or not the interrupt is a system interrupt (global interrupt). The LP identifier 172 indicates an LP that is the destination of the interrupt. The LP interrupt 173 indicates whether or not the interrupt is LP interrupt (local interrupt). The HW event 174 indicates whether or not to cause a hardware event, based on the interrupt factor.

In the case of system interrupt, the interrupt control unit 111 transmits an interrupt to an LP currently executing a thread. In addition, in the case of LP interrupt, the interrupt control unit 111 transmits an interrupt to the LP indicated by the LP identifier 172. In addition, in the case of the hardware event, the interrupt control unit 111 transmits a hardware event to the LP indicated by the LP identifier 172. This hardware event wakes up the LP.

In addition, the system interrupt 171 and the LP identifier 172 can be rewritten only by the OS at the virtual monitor level (monitor program), and the LP interrupt 173 and the HW event 174 can be rewritten only by the OS at the virtual monitor level and the supervisor level.

Next, memory access management in the processor system 10 is described.

Figure 26:
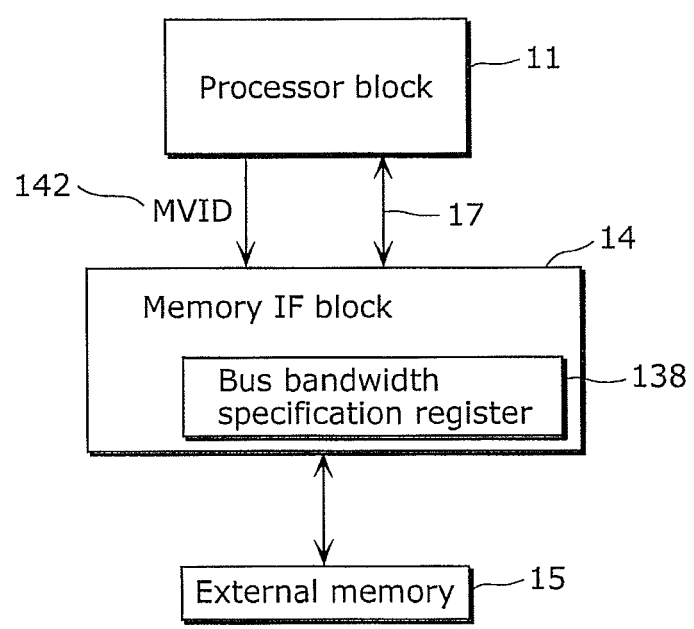
FIG. 26 is a diagram showing memory access management in a processor system according to the second embodiment of the present invention.

FIG. 26 is a diagram schematically showing a state of memory access management in the processor system 10. As shown in FIG. 26, the processor block 11 transmits the MVID 142 to the memory IF block 14. The memory IF block 14, using the MVID 142, allocates a bus bandwidth to each MVID142, and accesses the external memory 15, using the bus bandwidth allocated to the MVID142 of a thread that is a source of an access request.

In addition, the memory IF block 14 includes a bus bandwidth specification register 138.

Figure 27:
FIG. 27 is a diagram showing a bus bandwidth allocation performed by a memory IF block according to the second embodiment of the present invention.

FIG. 27 is a diagram showing an example of data held by the bus bandwidth specification register 138 in the memory IF block 14. Note that in FIG. 27, a different MVID 142 is assigned to each of: Linux that is host processing; audio processing (Audio) included in media processing, and image processing (Video) included in media processing.

As shown in FIG. 27, the memory IF block 14 allocates the bus bandwidth to each MVID 142. In addition, priority order is determined for each MVID 142, and an access to the external memory 15 is performed based on the priority order.

This ensures the bandwidth necessary for each MVID142, and also assures access latency that is requested. Thus, the processor system 10 can achieve assurance of performance and real-timeness of a plurality of applications.

In addition, even when the memory IF block 14 and the processor 11 are connected to each other only via one data bus 17, it is also possible, by dividing the bus bandwidth using the MVID 142, to perform the same control as in the case where the memory IF block 14 and the processor block 11 are connected via a plurality of data buses. In other words, it is possible to perform the same control as in the case of dividing the bus for a plurality of blocks.

Note that Japanese Unexamined Patent Application Publication No. 2004-246862 (Patent Reference 5) discloses a representative example of the technique of ensuring the bus bandwidth and assuring latency in response to access requests from a plurality of blocks, and therefore the detailed description thereof is omitted here.

In addition, the processor system 10 allows arbitrary setting of a ratio between processing time for media processing and processing time for host processing, using the TVID 140 and a conventional VMP function. Specifically, for example, the OS at the virtual monitor level sets, for the register (not shown) included in the VMPC 102, a processing time ratio (a ratio in processing time between media processing and host processing) for each TVID 140. With reference to this processing time ratio that is set and the TVID 140 of each thread, the VMPC 102 switches the thread to be executed by the execution unit 101 such that the processing time ratio is satisfied.

Next, resource division processing that is performed by the OS at the virtual monitor level (monitor program) is described.

Figure 28:
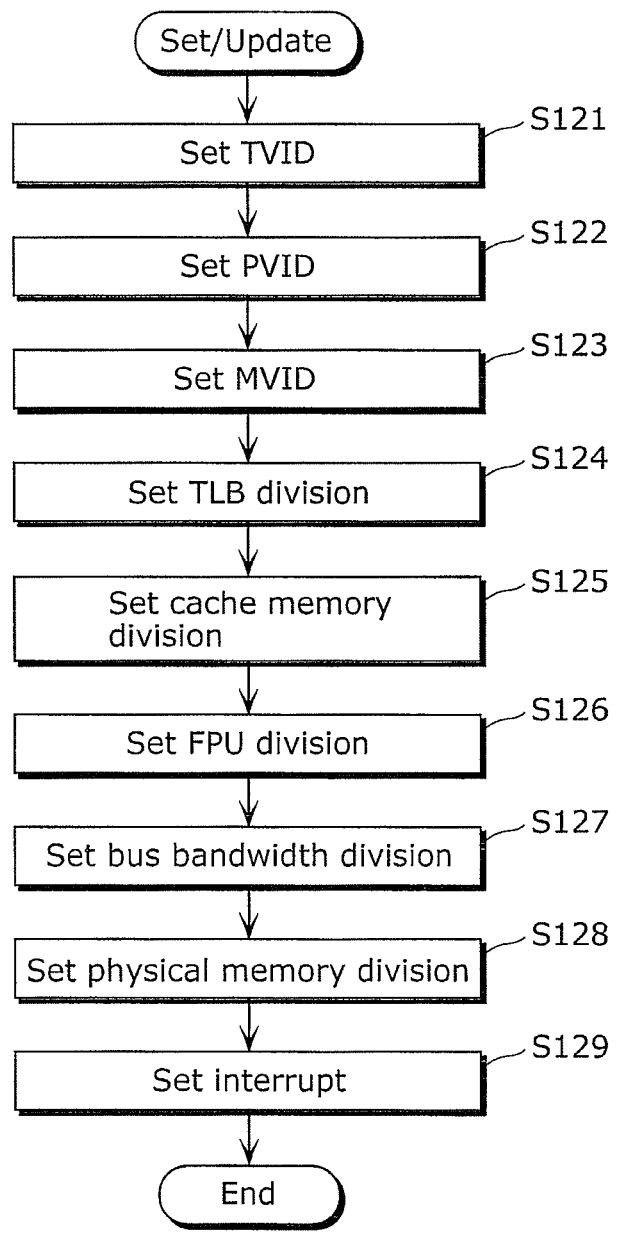
FIG. 28 is a flowchart showing a flow of resource division processing in the processor system according to the second embodiment of the present invention.

FIG. 28 is a flowchart showing a flow of the resource division processing by the monitor program.

First, the monitor program divides a plurality of threads into a plurality of groups, by setting the TVID 140, PVID 141, and MVID 142 of each of a plurality of contexts 124 (S121, S122, and S123).

Next, the monitor program divides a plurality of entries 150 included in the TLB 104 into first entries to be associated with host processing and second entries to be associated with media processing, by setting, for the entry specification register 135, a correspondence relationship between the TVID 140 and each entry 150 (S124).

With reference to the correspondence relationship set for the entry specification register 135 and the TVID 140 of the thread of the access source, the TLB 104 allocates each entry 150 to threads belonging to host processing and threads belonging to media processing.

In addition, the monitor program divides the plurality of ways 168 in the cache memory 109 into a first way to be associated with host processing and a second way to be associated with media processing, by setting, for the way specification register 136, a correspondence relationship between the TVID 140 (or LP) and the way 168 (S125).

With reference to the correspondence relationship set for the way specification register 136 and the TVID 140 of the access source thread, the TLB 104 allocates each way 168 to threads belonging to host processing and threads belonging to media processing.

In addition, the monitor program divides the plurality of FPUs 107 into a first FPU to be associated with host processing and a second FPU to be associated with media processing, by setting, for the FPU allocation register 137, a correspondence relationship between the TVID 140 and the FPU 107 (S126).

With reference to the correspondence relationship set for the FPU allocation register 137 and the TVID 140 of the thread, the FPU allocation unit 108 allocates each FPU 107 to threads belonging to host processing and threads belonging to media processing.

In addition, the monitor program divides the bus bandwidth between the external memory 15 and the memory IF block 14 into a first bus bandwidth to be associated with host processing and a second bus bandwidth to be associated with media processing, by setting, for the bus bandwidth specification register 138, a correspondence relationship between the MVID 142 and the bus bandwidth (S127).

With reference to the correspondence relationship set for the bus bandwidth specification register 138 and the MVID 142 of the access source thread, the memory IF block 14 allocates each bus bandwidth to threads belonging to host processing and threads belonging to media processing.

In addition, the monitor program generates a page table indicating a correspondence relationship between the physical address and the logical address. In performing this, the monitor program divides the physical address space of the external memory 15 into a first physical address range to be associated with host processing and a second physical address range to be associated with media processing, by setting the correspondence relationship between the PVID 141 and the physical address, and also allocates the first physical address to threads for host processing and the second physical address to threads for media processing (S128). In addition, the monitor program protects the physical address by setting, for the physical memory protection register 131, the correspondence relationship between the PVID 141 and the physical address.

In addition, the monitor program sets, in the interrupt control register 134, an LP to be interrupted and so on, corresponding to each interrupt factor (S129). This allows the monitor program to perform an interrupt control on host processing and media processing, independently from each other.

With reference to the correspondence relationship set for the interrupt control register 134 and the interrupt factor, the interrupt control unit 111 transmits an interrupt to a thread corresponding to the interrupt factor.

Note that the order of each setting by the monitor program is not limited to an order shown in FIG. 28.

Note that instead of generating the page table by the monitor program, each OS at the supervisor level, which is assigned with the TVID 140, can also determine a logical address corresponding to the physical address allocated to each OS and generate a page table independently; thus, the present invention is not limited to the present embodiment.

As described above, the processor system 10 according to the present embodiment allows increasing area efficiency by including a single processor block 11 that performs host processing and media processing by sharing resources. Furthermore, the processor system 10 assigns different tag information (TVID 140, PVID 141, and MVID 142) to threads for host processing and threads for media processing, and also divides the resource belonging to the processor system 10 in association with the tag information. This allows the processor system 10 to allocate an independent resource to each of host processing and media processing. Accordingly, since no competition occurs for resources between the host processing and media processing, the processor system 10 can achieve performance assurance and increase robustness.

In addition, the physical address management unit 105 generates an interrupt when each thread attempts to access, using the PVID 141, a physical address range that is other than the specified physical address range. This allows the processor system 10 to increase system robustness.

Thus far, the processor system 10 according to the present embodiment has been described, but the present invention is not limited to this embodiment.

For example, in the description above, an example in which the processor block 11 performs two types of processing, that is, host processing and media processing, has been described, but three or more types of processing including other processing may be performed. If this is the case, three or more types of TVID 140 corresponding to the three or more types of processing are assigned to a plurality of threads.

Likewise, the types of the PVID 141 and the MVID 142 are not limited to the number described above, but it is only necessary to provide more than one type.

In addition, in the description above, as tag information for grouping a plurality of threads, three types of tag information the TVID 140, the PVID 141, and the MVID 142 have been described, but the processor system 10 may use only one tag information (for example, TVID 140). In other words, the processor system 10 may use TVID 140, instead of using PVID 141 and MVID 142, for physical address management and bus bandwidth control. In addition, the processor system 10 may use two types of tag information, and may use four or more types of tag information.

In addition, in the description above, the interrupt control register 134, the entry specification register 135, the way specification register 136, the FPU allocation register 137, and the page table have been described as being set and updated by the OS at the virtual monitor level (monitor program), but the OS at the supervisor level, according to an instruction from the OS at the virtual monitor level, may set and update the interrupt control register 134, the entry specification register 135, the way specification register 136, the FPU allocation register 137, and the page table. In other words, the OS at the virtual monitor level may notify the allocated resource to the OS at the supervisor level, and the OS at the supervisor level may set and update the interrupt control register 134, the entry specification register 135, the way specification register 136, the FPU allocation register 137, and the page table such that the notified resource is used.

In addition, each processing unit included in the processor system 10 according to the present embodiment is typically realized as an LSI that is an integrated circuit. These functions may be separately configured as a single chip, or may be configured as a single chip to include part or all of these functions.

The LSI here may also be called an IC, a system LSI, a super LSI, or an ultra LSI, depending on the degree of integration.

In addition, the integration method is not limited to the LSI, but may also be realized as a dedicated circuit or a general-purpose processor. After manufacturing the LSI, a field programmable gate array (FPGA) that allows programming or a reconfigurable processor in which connections of circuit cells and settings within the LSI are reconfigurable may be used.

Furthermore, when another integrated circuit technology appears to replace the LSI as a result of development of the semiconductor technology or some derivative technique, these function blocks may naturally be integrated using the technology. The possibility of application of bio technology and so on can be considered.

In addition, part or all of the functions of the processor system 10 according to the embodiments of the present invention may be realized by the execution unit 101 and so on executing a program.

Furthermore, the present invention may be the program, and may be a recording medium on which the program is recorded. In addition, it goes without saying that the program can be distributed via a transmission medium such as the Internet.

In addition, at least part of the functions of the processor system 10 and the variation thereof according to the embodiments above may be combined.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

Industrial Applicability

The present invention is applicable to a processor apparatus and a multithread processor apparatus, and is particularly appropriate for a processor device and a multiprocessor device for media processing that are to be incorporated in a digital television, a DVD recorder, a digital camera, a cellular phone, and so on.

What is claimed is:
1. A processor apparatus comprising:
a plurality of processors which execute a plurality of programs, switchin the programs;
at least one hardware resource which includes a register for holding register data and complements execution of an instruction to be executed by each of said processors;
a memory for storing extension context data for each program among the programs that includes a predetermined instruction for using said at least one hardware resource, the extension context data being a copy of the register data in said at least one hardware resource;
a first determination unit configured to determine whether or not there is a possibility that the extension context data of one of the programs that is currently executed is held in said at least one hardware resource; and
a second determination unit configured to determine whether or not the extension context data in said at least one hardware resource belongs to one of said processors that has attempted to execute the predetermined instruction,
wherein said at least one hardware resource executes the predetermined instruction, without performing the save and restore of the extension context data between said at least one hardware resource and said memory, when the execution of the predetermined instruction is attempted, and when said first determination unit determines that there is the possibility and said second determination unit determines that the extension context data in said at least one hardware resource belongs to said one of said processors that has attempted to execute the predetermined instruction, and
said at least one hardware resource is an extended calculation unit configured to execute an extended instruction that is not executable by said processors, and the predetermined instruction is the extended instruction.

2. The processor apparatus according to claim 1,
wherein said first determination unit includes a data determination unit provided for each of said processors,
said determination unit is configured to determine, when one of said processors that corresponds to said data determination unit attempts to execute the predetermined instruction in the one of the programs, whether or not there is a possibility that the extension context data of the one of the programs that is currently executed by said one of said processors that corresponds to said data determination unit is held in said at least one hardware resource,
said second determination unit includes a processor determination unit provided for each of said processors, and
said processor determination unit is configured to determine whether or not the extension context data in said at least one hardware resource belongs to said one of said processors that has attempted to execute the predetermined instruction.

3. The processor apparatus according to claim 2,
wherein said processor apparatus is configured to generate:
a first control signal which instructs first transfer processing for saving the extension context data from said at least one hardware resource to said memory and restoring extension context data belonging to a same one of said processors that the saved extension context data belongs to, the save and restore being performed according to results of the determination by said first and said second determination units; and
a second control signal which instructs second transfer processing for saving the extension context data from said at least one hardware resource to said memory and restoring extension context data belonging to an other of said processors that is different from said one of said processors that the saved extension context data belongs to, the save and restore being performed according to the results of the determination by said first and said second determination units.

4. The processor apparatus according to claim 3, wherein each of said processors includes a state register, said state register holds first state information and second state information, the first state information indicating, for each of said at least one hardware resource, whether or not there is the possibility that the extension context data of the one of the programs that is currently executed is held in said at least one hardware resource, and the second state information indicating, for each of said at least one hardware resource, one of said processors that corresponds to the extension context data held in said at least one hardware resource, said data determination unit includes a first determination circuit which determines whether the first state information is true or false when one of said processors that corresponds to said data determination unit attempts to execute the predetermined instruction in the one of the programs that is currently executed, and which generates a first control signal when the first state information is determined to be false, said processor determination unit includes a second determination circuit which determines whether or not said one of said processors that corresponds to said data determination unit matches said one of said processors that is indicated by the second state information when said first determination unit corresponding to said processor determination unit determines that the first state information is true, and which generates a second control signal when said one of said processors that corresponds to said data determination unit does not match said one of said processors that is indicated, and said at least one hardware resource promptly operates according to the predetermined instruction without waiting for the save and restore of the extension context data, when said second determination circuit determines that said corresponding one of said processors matches said one of said processors.

5. The processor apparatus according to claim 4, wherein the first control signal is a first exceptional interrupt signal for activating the first transfer processing, and the second control signal is a second exceptional interrupt signal for activating the second transfer processing.

6. The processor apparatus according to claim 5, wherein the first transfer processing includes: saving the extension context data from said at least one hardware resource to said memory and restoring, from said memory to said at least one hardware resource, the extension context data of said one of said processors that has attempted to execute the predetermined instruction, when the first exceptional interrupt signal is generated, said processors include a first processor and a second processor, said first processor executes a plurality of programs by time division multiplexing, by executing a first operating system, said second processor executes a plurality of programs by time division multiplexing, by executing a second operating system that is different from the first operating system, the first transfer processing is activated either by the first operating system when said first determination circuit in said first processor generates the first exceptional interrupt signal or by the second operating system when said first determination circuit in said second processor generates the first exceptional interrupt signal.

7. The processor apparatus according to claim 6, wherein at least one of said processors executes a third operating system which manages the first operating system and the second operating system, and the second transfer processing is activated by the third operating system when said second determination circuit in any one of said processors generates the second exceptional interrupt signal.

8. The processor apparatus according to claim 7, wherein the third operating system waits for said one of said at least one hardware resource to be released and subsequently activates the second transfer processing, when said second determination circuit in said any one of said processors generates the second exceptional interrupt signal, and when one of said at least one hardware resource is currently executing a predetermined instruction of an other of said at least one of said processors.

9. The processor apparatus according to claim 7, wherein the second transfer processing is atomically performed, from start of an operation of saving, from said at least one hardware resource to said memory, the extension context data corresponding to said other of said processors, to completion of an operation of restoring, from said memory to said at least one hardware resource, the extension context data of said one of said processors that has attempted to execute the predetermined instruction.

10. The processor apparatus according to claim 7, wherein each of said processors includes a clear circuit which clears the second state information corresponding to each of said processors when each of said processors moves into one of a stop state, a wait state, and a sleep state.

11. The processor apparatus according to claim 10, wherein said state register holds third state information indicating whether or not the second state information is to be locked, and the third operating system inhibits the second state information from being cleared by said clear circuit when the third state information indicates that the second state information is to be locked.

* * * * *